US011214661B2

(12) United States Patent
Rodriques et al.

(10) Patent No.: US 11,214,661 B2
(45) Date of Patent: Jan. 4, 2022

(54) THREE-DIMENSIONAL NANOFABRICATION BY PATTERNING OF HYDROGELS

(71) Applicant: Massachusetts Institute of Technology, Cambridge, MA (US)

(72) Inventors: Samuel G. Rodriques, Cambridge, MA (US); Daniel Oran, Cambridge, MA (US); Ruixuan Gao, Cambridge, MA (US); Shoh Asano, Cambridge, MA (US); Mark A. Skylar-Scott, Brookline, MA (US); Fei Chen, Cambridge, MA (US); Paul W. Tillberg, Cambridge, MA (US); Adam H. Marblestone, Medford, MA (US); Edward S. Boyden, Chestnut Hill, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 130 days.

(21) Appl. No.: 15/261,163

(22) Filed: Sep. 9, 2016

(65) Prior Publication Data

US 2017/0081489 A1 Mar. 23, 2017

Related U.S. Application Data

(60) Provisional application No. 62/366,841, filed on Jul. 26, 2016, provisional application No. 62/219,938, filed on Sep. 17, 2015.

(51) Int. Cl.
*C08J 7/12* (2006.01)
*C08J 7/02* (2006.01)
(Continued)

(52) U.S. Cl.
CPC .......... *C08J 7/123* (2013.01); *B29C 35/0805* (2013.01); *B33Y 80/00* (2014.12); *C08J 3/075* (2013.01);
(Continued)

(58) Field of Classification Search
CPC ..... C08J 7/123; C08J 3/075; C08J 3/28; C08J 7/02; C08J 7/12; C08J 2333/26;
(Continued)

(56) References Cited

U.S. PATENT DOCUMENTS 5,736,590 A * 4/1998 Rasmussen ............... C08J 3/075 523/113
5,952,232 A * 9/1999 Rothman ............... C12N 15/87 435/320.1
(Continued)

FOREIGN PATENT DOCUMENTS

WO 2014152984 A1 9/2014

OTHER PUBLICATIONS

Ting, L., "Preparation of novel core-shell nanoparticles by electrochemical synthesis," Trans. Nonferrous Met. Soc. China, vol. 17, pp. 1343-1346 (2007).
(Continued)

*Primary Examiner* — Matthew J Daniels
*Assistant Examiner* — Hana C Page
(74) *Attorney, Agent, or Firm* — Elmore Patent Law Group, P.C.; Joseph Zucchero; Carolyn Elmore

(57) ABSTRACT

The present invention enables three-dimensional nanofabrication by isotropic shrinking of patterned hydrogels. A hydrogel is first expanded, the rate of expansion being controlled by the concentration of the crosslinker. The hydrogel is then infused with a reactive group and patterned in three dimensions using a photon beam through a limited-diffraction microscope. Functional particles or materials are
(Continued)

then deposited on the pattern. The hydrogel is then shrunk and cleaved from the pattern.

45 Claims, 32 Drawing Sheets

(51) Int. Cl.
| | |
|---|---|
| *B29C 35/08* | (2006.01) |
| *C08J 3/075* | (2006.01) |
| *C08J 3/28* | (2006.01) |
| *B33Y 80/00* | (2015.01) |
| *B29K 105/00* | (2006.01) |

(52) U.S. Cl.
CPC . *C08J 3/28* (2013.01); *C08J 7/02* (2013.01); *C08J 7/12* (2013.01); *B29C 2035/0838* (2013.01); *B29K 2105/0061* (2013.01); *C08J 2333/26* (2013.01)

(58) Field of Classification Search
CPC ............... B33Y 80/00; B29C 35/0805; B29C 2035/0838; B29K 2105/0061
USPC .......................................................... 264/482
See application file for complete search history.

(56) References Cited

U.S. PATENT DOCUMENTS

| | | | |
|---|---|---|---|
| 6,268,161 B1* | 7/2001 | Han | A61B 5/0031 435/14 |
| 6,271,278 B1* | 8/2001 | Park | A61L 15/60 521/102 |
| 2004/0248326 A1* | 12/2004 | Ziaie | A61K 9/0024 438/1 |
| 2005/0034990 A1* | 2/2005 | Crooks | B01L 3/502753 204/450 |
| 2005/0169962 A1 | 8/2005 | Bhatia et al. | |
| 2005/0196702 A1* | 9/2005 | Bryant | A61L 27/16 430/311 |
| 2006/0110760 A1* | 5/2006 | Kim | B01J 19/0046 435/6.12 |
| 2006/0165912 A1 | 7/2006 | Koberstein et al. | |
| 2007/0023942 A1* | 2/2007 | Andino | B29C 35/0805 264/1.32 |
| 2007/0116607 A1* | 5/2007 | Wang | B01L 3/502715 422/83 |
| 2007/0134902 A1* | 6/2007 | Bertino | G03F 7/2043 438/610 |
| 2008/0286360 A1* | 11/2008 | Shoichet | C07D 311/16 424/486 |
| 2009/0011141 A1 | 1/2009 | Carter et al. | |
| 2009/0096133 A1* | 4/2009 | Doyle | B29C 59/16 264/400 |
| 2010/0055161 A1* | 3/2010 | Ahn | A61K 8/0212 424/449 |
| 2010/0119755 A1 | 5/2010 | Chung et al. | |
| 2010/0285113 A1* | 11/2010 | Shoichet | A61P 41/00 424/450 |
| 2011/0087315 A1 | 4/2011 | Richardson-Burns et al. | |
| 2011/0091717 A1 | 4/2011 | Weiss | |
| 2011/0291357 A1* | 12/2011 | Boyle | A63B 67/06 273/242 |
| 2012/0029416 A1* | 2/2012 | Parker | A61L 27/56 604/20 |
| 2012/0310223 A1 | 12/2012 | Knox et al. | |
| 2014/0087139 A1* | 3/2014 | Rowley | B41C 1/05 428/156 |
| 2014/0193651 A1 | 7/2014 | Kharlampieva et al. | |
| 2014/0204364 A1* | 7/2014 | Asher | G01N 15/0211 356/38 |
| 2015/0240035 A1* | 8/2015 | Lewicki | C08K 5/5419 428/195.1 |

OTHER PUBLICATIONS

Chaudhuri, R.G., et al., Core/Shell Nanoparticles: Classes, Properties, Synthesis Mechanisms, Characterization, and Applications, Chemical Reviews, vol. 112, pp. 2373-2433 (2012).

Cutler, J., et al., "Spherical Nucleic Acids," Journal of the American Chemical Society, vol. 134, pp. 1376-1391 (2012).

* cited by examiner

THREE-DIMENSIONAL NANOFABRICATION BY PATTERNING OF HYDROGELS

RELATED APPLICATIONS

This application claims the benefit of U.S. Provisional Application Ser. No. 62/219,938, filed Sep. 17, 2015, and U.S. Provisional Application Ser. No. 62/366,841, filed Jul. 26, 2016, the contents of which are incorporated herein by reference in their entirety.

GOVERNMENT SUPPORT

This invention was made with Government support under Grant No. R01 MH103910 and U01 MH106011 awarded by the National Institutes of Health (NIH). The Government has certain rights in the invention.

BACKGROUND OF THE INVENTION

The ability to assemble custom three-dimensional patterns of functional materials over millimeter scales with nanometer resolution would have wide-ranging impact in areas such as photonics and materials science[1-5]. One approach to this problem would be to assemble the material at a more accessible length scale before shrinking it to the desired size. All shrinking methods to date have either been anisotropic[6-8], or have relied on compositional changes in the substrate under extreme conditions[9], which limits the range of functional materials that can be used. Here, inspiration is drawn from the coil-globule transition in polymers: hydrogels are known to undergo volumetric phase transitions in response to mild environmental changes that alter the balance of interactions between polymer chains and the solvent[10-12]. However, to date, the isotropy of this shrinking process has not been characterized.

Therefore, it would be desirable to have a method wherein precision millimeter to nanoscale fabrication is enabled through three-dimensional patterning of hydrogels with functional materials through the use of diffraction-limited microscopy and optionally, sizing of the patterning through isotropic shrinking.

SUMMARY OF THE INVENTION

The present invention provides a method for the assembly of custom patterns in up to three dimensions of functional materials over millimeter scales with nanometer resolution. In one embodiment, a material (e.g., a gel) is photo-patterned with functional materials. In one embodiment, the photo-patterning can be performed using ordinary two-photon microscopes.

The present invention provides a method for photo-patterning below the classical diffraction limit. In one embodiment, the custom three-dimensional patterns of functional materials are assembled at a more accessible scale and then subsequently shrunk. In one embodiment, 10,000-fold volumetric shrinkage of polyacrylate hydrogels is sufficiently isotropic to preserve embedded patterns of functional materials with nanoscale precision. It is demonstrated that photo-patterning such a gel with functional materials using a diffraction-limited microscope, and then shrinking it, yields designed 3-D objects with feature sizes in the tens of nanometers. This technology, termed Implosion Fabrication (ImpFab), supports the anchoring of nanoparticles, proteins, DNA, and small molecules with nanoscale precision over length scales of hundreds of microns to millimeters, and may open up many new possibilities in the programmable fabrication of complex nanomaterials.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
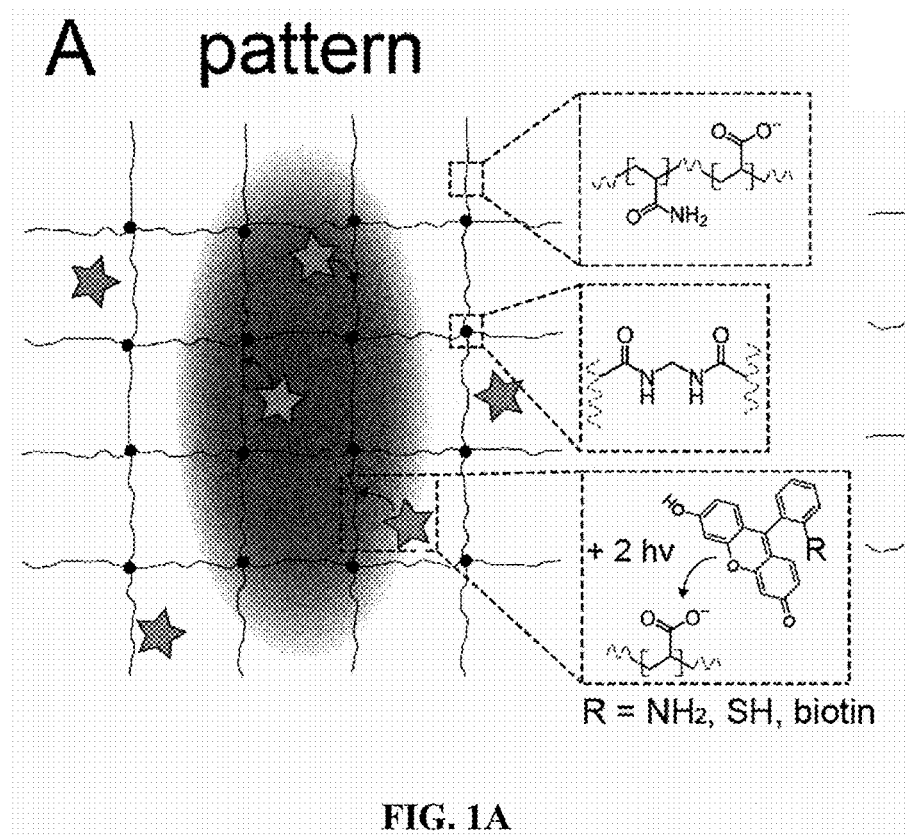
FIG. 1A-H. Implosion fabrication (ImpFab) process. (1A) Schematic of the patterning process, showing the expanded polyelectrolyte gel (polyacrylate, black lines; crosslinkers, black dots), and the fluorescein (green star) bearing a functional group binding to the polymer matrix upon photon excitation (red volume). Insets show, from top to bottom, polyacrylate backbone, cross-linker, and fluorescein binding to a carboxy group. (1B) Schematic of functionalization of gel sites by delivering small molecules, proteins, DNAs and nanoparticles into the gel which then link to the polymer network at previously patterned binding sites. Red outline indicates volume illuminated in 1A. NHS, N-hydroxysuccinimide ester. (1C) Schematic of the implosion process, showing isotropic shrinking of the gel matrix, and associated functional materials. (1D, 1E) Confocal fluorescence images of patterned and imploded (via hydrochloric acid followed by dehydration) gels, with Atto 647N added in the functionalization step for visualization. Shown are patterns before implosion (left, 0.075% cross-linker concentration), after implosion with 10× shrinking factor (top right, 0.075% cross-linker concentration), and after implosion with 20× shrinking factor (bottom right, 0.0172% cross-linker concentration). (1F) Photographic images of the same gel before (left) and after (right) shrinking (0.0172% cross-linker concentration). (1G) 3D plot of surface height of the acid-shrunken gel measured by atomic force microscopy. (1H) Bar graph of the mean shrink factor (initial size/final size) for gels patterned with aminomethyl fluorescein, obtained with 0.075% crosslinker (left) and 0.0172% crosslinker (right) gel stock (mean±standard deviation). A similar plot but using fluorescein cysteamine as the functionalization chemical is in FIG. 4.

The terms "a", "an" and "the" as used herein are defined to mean "one or more" and include the plural unless the context is inappropriate.

The present invention provides a method for nanofabrication of patterns in up to three dimensions of functional materials within a hydrogel over millimeter scales with nanometer resolution.

The terms "polymer gel material" or "swellable polymer gel material" generally refer to a material that expands when contacted with a liquid, such as water or other solvent. The swellable polymer gel material uniformly expands in three dimensions. Additionally or alternatively, the material is transparent such that, upon expansion, light can pass through it.

In a first embodiment, the invention provides a method comprising the steps of:
 a) providing a polymer gel material; and
 b) infusing the polymer gel material with at least one reactive group; and
 c) illuminating selected voxels within the polymer gel material to yield a pattern of reactive group sites anchored to the polymer gel material; and d) removing excess reactive groups from the polymer gel material; and e) depositing functional molecules or nanoparticles on the reactive group sites.

In one embodiment, the pattern is three-dimensional.

In a preferred embodiment, the polymer gel material comprises a polyectrolyte. One or more polymerizable materials, monomers or oligomers can be used, such as monomers selected from the group consisting of water soluble groups containing a polymerizable ethylenically unsaturated group. Monomers or oligomers can comprise one or more substituted or unsubstituted methacrylates, acrylates, acrylamides, methacrylamides, vinylalcohols, vinylamines, allylamines, allylalcohols, including divinylic crosslinkers thereof, (e.g., N, N-alkylene bisacrylamides). Precursors can also comprise polymerization initiators, accelerators, inhibitors, buffers, salts and crosslinkers.

In another embodiment, the reactive group is attached to the polymer gel material by a reaction between a fluorophore compound and the polymer gel material.

In yet another embodiment, the polymer gel material is swellable. The swellable polymer gel material may be polyacrylate and copolymers or crosslinked copolymers thereof. Alternatively or additionally, the swellable polymer gel material can be formed by chemically crosslinking water soluble oligomers or polymers. For example, if the swellable polymer gel material is to be a sodium polyacrylate polymer material, a solution comprising the monomers sodium acrylate and acrylamide, and a crosslinker selected from N,N'-methylenebisacrylamide (BIS), N,N'-(1,2-Dihydroxythylene)bisacrylamide), and (DHEBA) N,N'-Bis(acryloyl) cystamine (BAC) is activated to form sodium polyacrylate or copolymer thereof.

The swellable polymer gel material may optionally be expanded to yield an expanded material. The rate of expansion may be controlled by varying the concentration of the crosslinker.

In another embodiment, the expanded material may optionally be shrunk to yield a shrunken material. Doing so increases the density of the functional molecules and increases the resolution of the pattern. Shrinking of the expanded material may be achieved by any means known by a person of ordinary skill in the art. For example, shrinking the expanded material may be achieved by exposing the expanded material to high salt or hydrochloric acid. Where hydrochloric acid was used to shrink the expanded material, the shrunken material may be dehydrated.

In still another embodiment, the polymer gel material comprises acrylate and acrylamide as co-monomers.

In another embodiment, the crosslinker of the polymer gel material comprises N,N'-methylenebisacrylamide.

In yet another embodiment, illuminating of the polymer gel material is performed using a diffraction-limited microscope. Preferably the type of illumination is 2-photon absorption.

In another embodiment, the polymer gel material is stained with a conjugate comprising biotin. This is done after illuminating the polymer gel material and formation of the reactive group sites. The biotin conjugate binds with the amine groups of the fluorophore compound.

In a further embodiment, the polymer gel material is stained with a reagent comprising streptavidin. The reagent may further comprise metal nanoparticles such as gold nanoparticles. Excess streptavidin may be washed out of the polymer gel material.

In another embodiment, growth or enhancement of the metal nanoparticles in situ is achieved through deposition of metal in an aqueous phase on the metal particles. For example, an enhancement solution comprising silver may be applied to the polymer gel material causing deposition or growth of silver on top of the metal nanoparticles.

Figure 10:
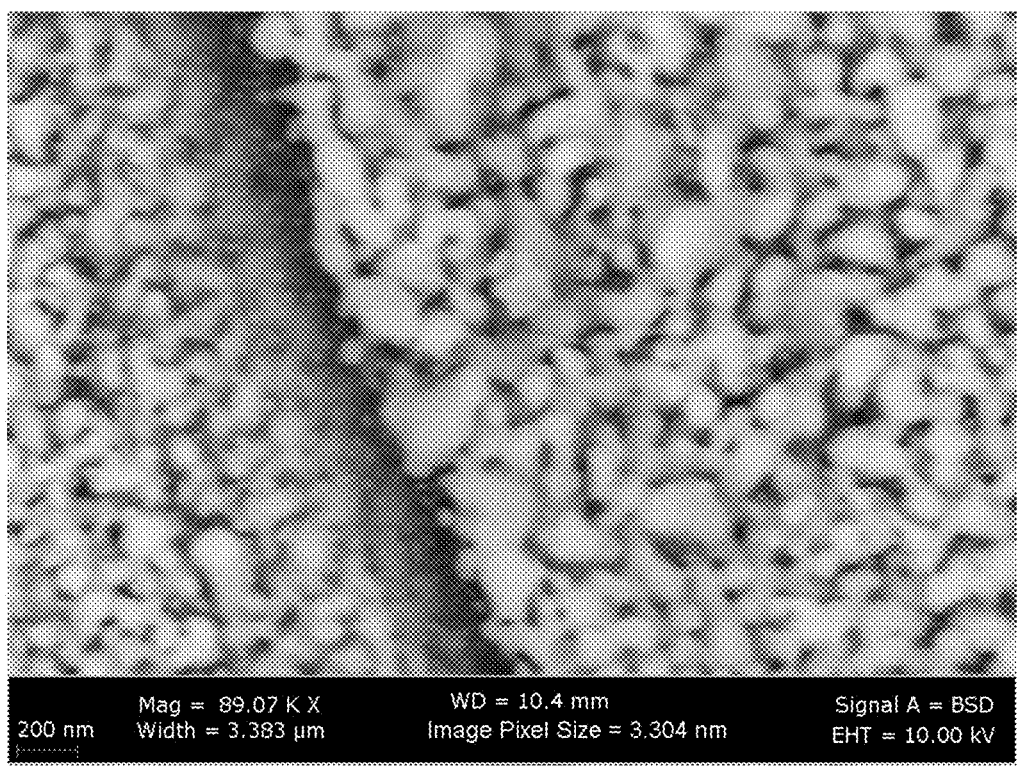
FIG. 10. Laser sintering of metal nanoparticles.
Figure 11:
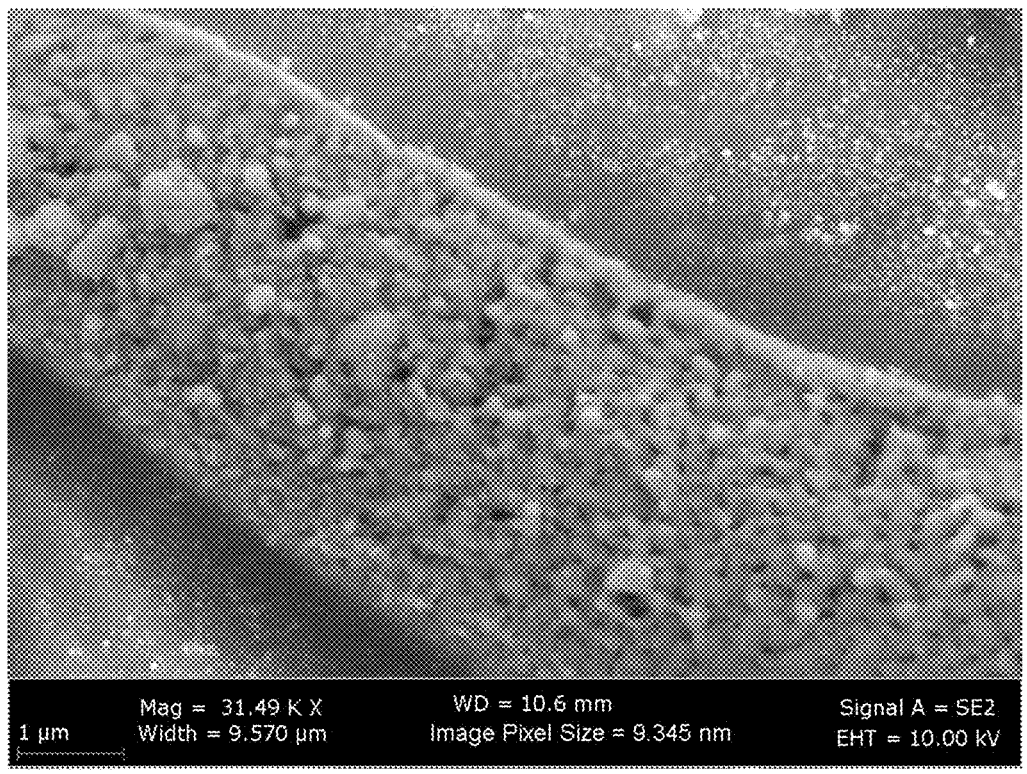
FIG. 11. Additional view of laser sintering.
Figure 12:
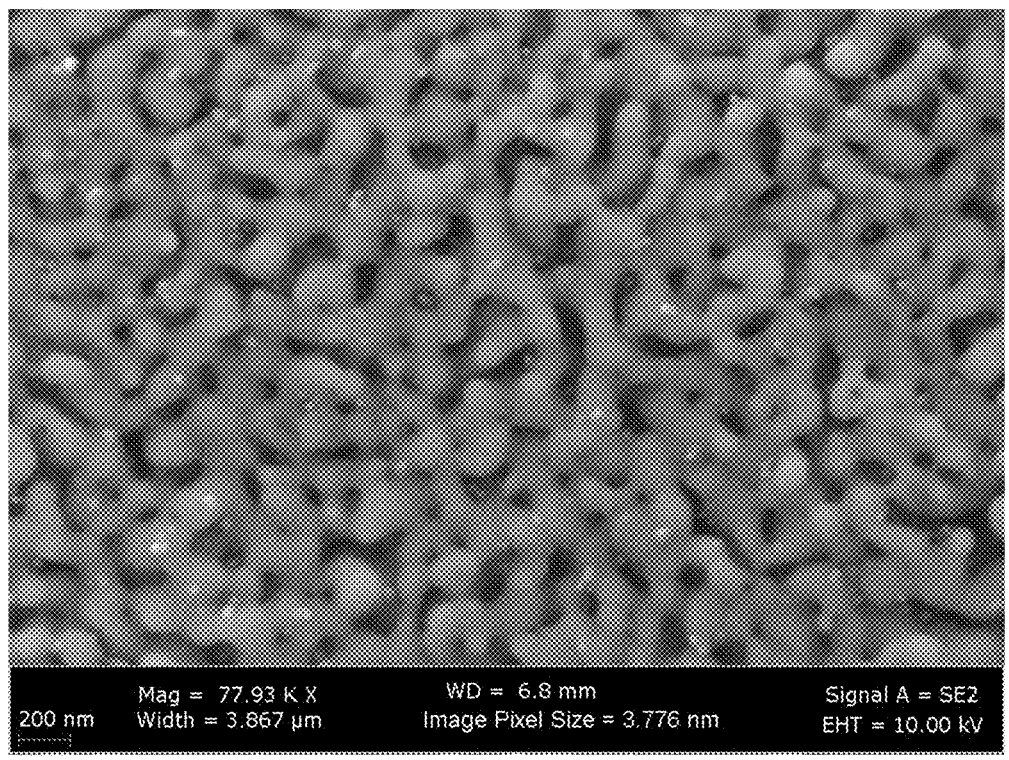
FIG. 12. Conductivity sintering of metal nanoparticles.
Figure 13:
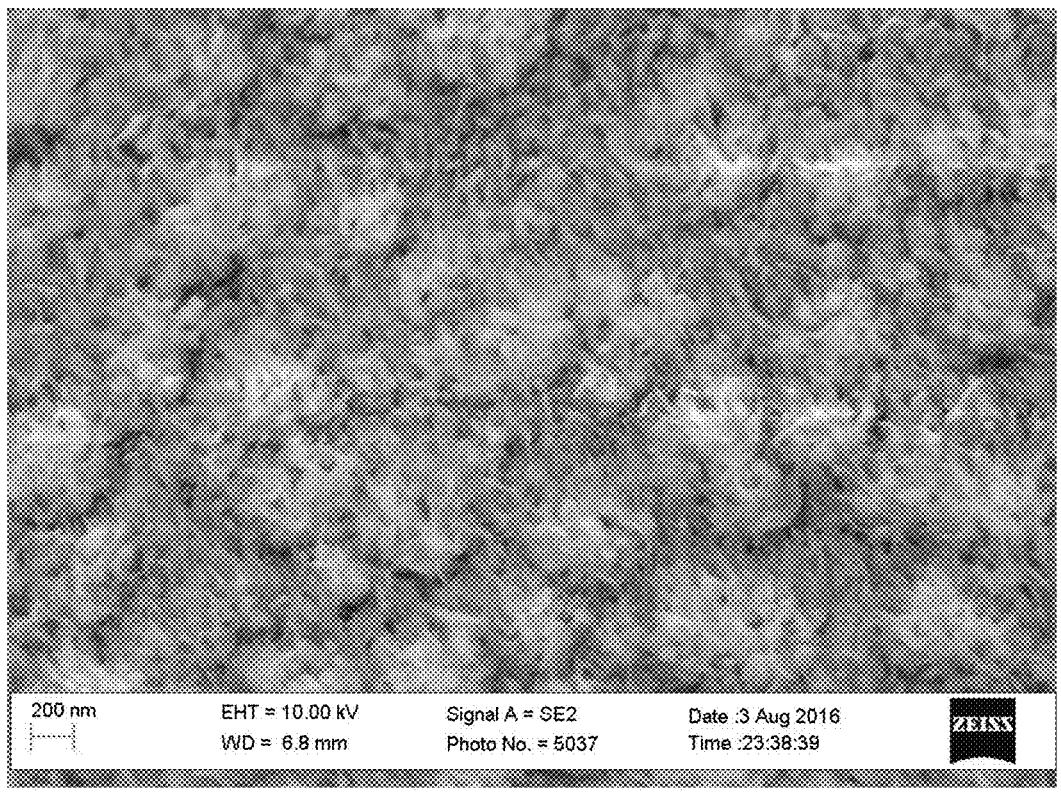
FIG. 13. Plasma sintering of metal nanoparticles.

In yet another embodiment, the metal nanoparticles are sintered. Sintering methods may comprise application of electrical current across the metal nanoparticles (FIG. 12), use of a laser (FIGS. 10 and 11), and plasma etching (FIG. 13).

Figure 14:
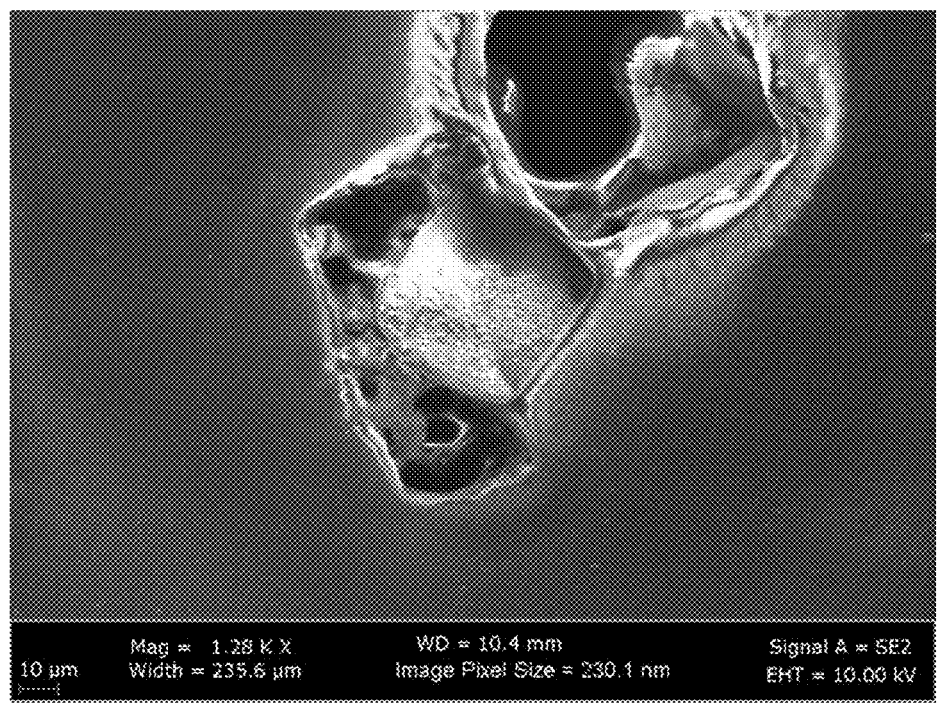
FIG. 14. Gel removal in a defined area (rectangle) without damaging the metal structure (square) present.
Figure 15:
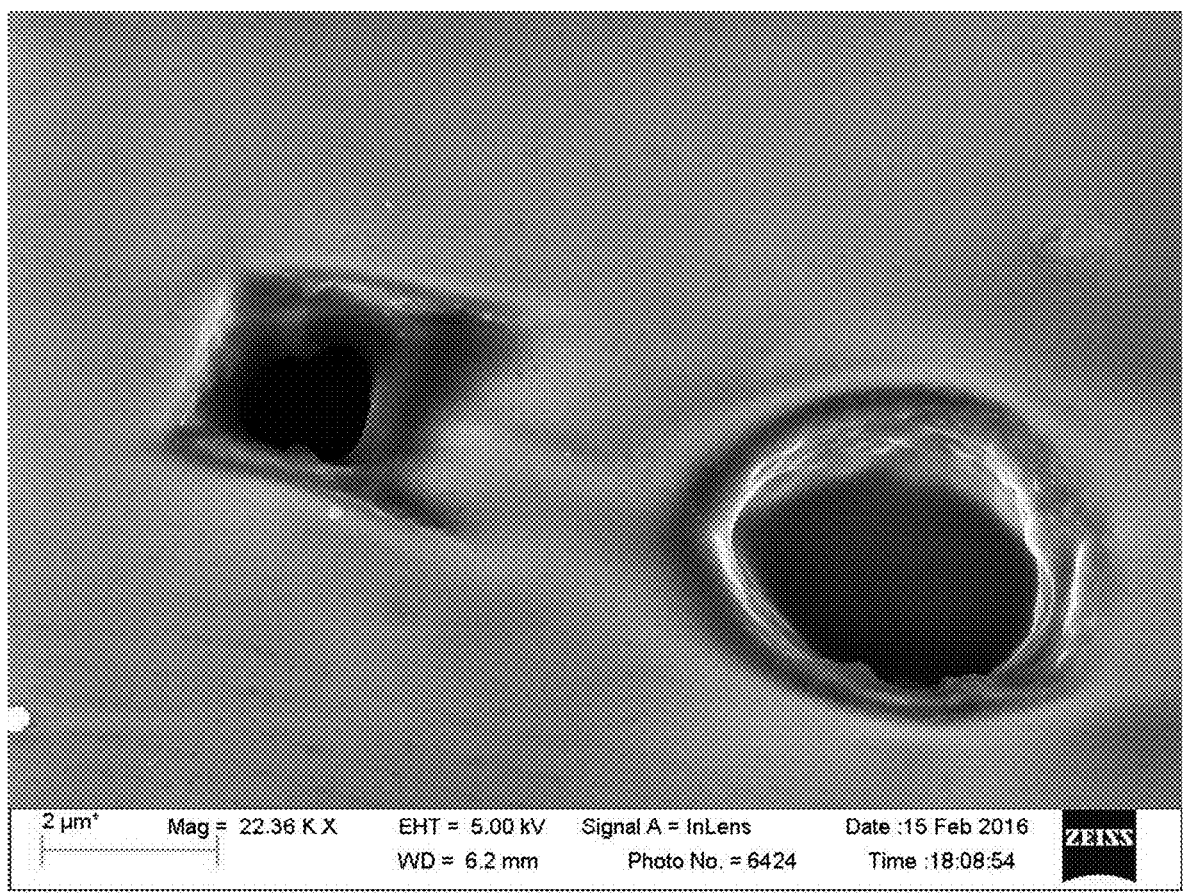
FIG. 15. Image showing gel material removed prior to shrinking.

In another embodiment, a portion of the polymer gel material may be removed. Removal methods may comprise use of a laser. The polymer gel material may optionally be removed while it is being infused (FIG. 15), or after it has been shrunken and dehydrated (FIG. 14).

Figure 16:
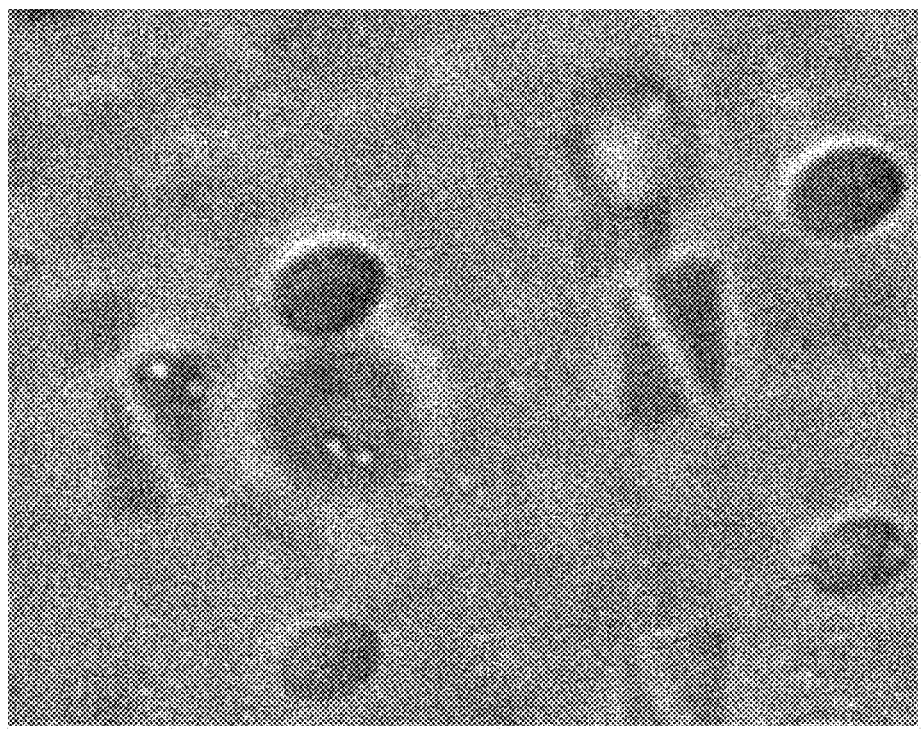
FIG. 16. Image taken using differential interference contrast and showing that the index of refraction of the substrate is changed where the substrate has been patterned.

In another embodiment and as shown in FIG. 16, illuminating the polymer gel material alters its refractive index and allows writing refractive index gradients into the polymer gel material.

In still another embodiment, the functional materials further comprise semiconductor nanocrystals passivated with a polymer. Examples of semiconductor nanocrystals include but are not limited to, cadmium telluride nanoparticles and cadmium selenide nanoparticles.

Figure 17:
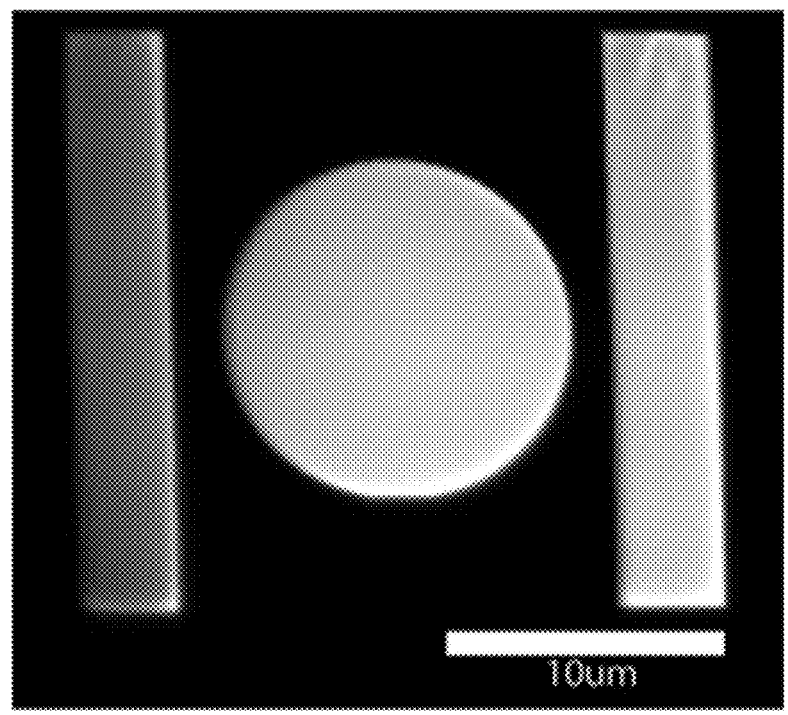
FIG. 17. Image demonstrating patterning multiple different materials into the same substrate.

Other embodiments contemplate multiplex patterning as shown in FIG. 17, wherein previously described methods are used and repeated on the same sample of polymer gel material such that the reactive groups formed between iterations are distinct. This multiplex patterning therefore allows deposition of distinct functional molecules on the distinct reactive groups between iterations to the next.

In a combined embodiment, the present invention provides a method for photo patterning below the classical diffraction limit. In one embodiment, the custom three-dimensional patterns of functional materials are assembled at a more accessible scale and then subsequently shrunk.

The present invention will be better understood in connection with the following Examples. However, it should be understood that these examples are for illustrative purposes only and are not meant to limit the scope of the invention. Various changes and modifications will be apparent to those skilled in the art and such changes and modifications including, without limitation, those relating to the formulations and/or methods of the invention may be made without departing from the spirit of the invention and the scope of the appended claims.

EXAMPLES

As used herein, the term "swellable material" generally refers to a material that expands when contacted with a liquid, such as water or other solvent. Preferably, the swellable material uniformly expands in three dimensions. Additionally or alternatively, the material is transparent such that, upon expansion, light can pass through the material. Preferably, the swellable material is a swellable polymer or hydrogel.

Figure 1B:
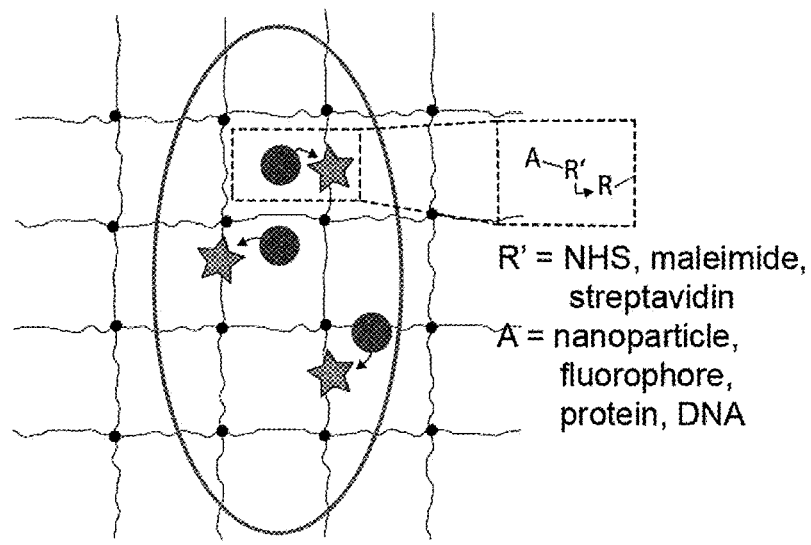
Figure 1C:
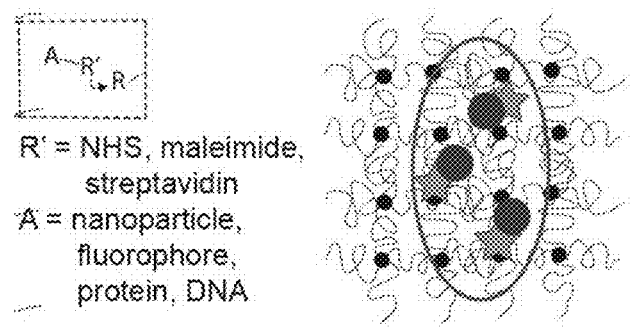

Polyelectrolyte hydrogels are well known for their ability to expand and shrink up to ~10-fold in linear dimension in response to changes in temperature, pH, salt concentration, or electric field strength.[10,13] Gel expansion was recently shown to preserve, with nanometer precision, the three-dimensional arrangement of molecules covalently bound to a gel matrix, likely due to the fine mesh size (~1-2 nm) of such polymer gels[14-16]. The question of whether gel shrinkage could achieve fine resolutions was assessed, following covalent attachment of materials to targeted sites in the gel matrix. Polyelectrolyte hydrogels were synthesized via freeradical polymerization of sodium acrylate (with acrylamide as co-monomer and N,N'-methylenebisacrylamide as crosslinker). Dialyzing the sample in water causes expansion, with the expansion factor set by the crosslinker concentration (e.g., 0.075% and 0.0172% resulted in gels that expanded by 5× and 10× respectively). After dialysis, expanded gels were infused with fluorescein bearing a reactive group for further functionalization (e.g., an amine). Two-photon illumination of a voxel within the gel using a commercial microscope caused fluorescein to bind at that site in the polymer matrix (FIG. 1A). Sites illuminated could then be functionalized by attaching molecules or nanoparticles to the reactive groups anchored to the gel (FIG. 1B). Finally, the gel was shrunken via exposure to high salt, or to hydrochloric acid. Acid treated gels were subsequently dehydrated resulting in an anhydrous state (FIG. 1C). Data showed that the gels, and the patterns within (FIG. 1D, E), were able to implode consistently by a linear factor (FIG. 1H) of 10.6±0.8 for 0.075% crosslinker gels (mean standard deviation, n=5 gels), or 20.1±2.9 for 0.0172% crosslinker gels (n=4 gels). The final dehydrated gel was transparent (FIG. 1F), and flexible. Atomic force microscopy (AFM) characterization of the surface of the shrunken gel measured the surface roughness over a 1×1 μm window to be 0.19 nm (root-mean square (RMS); FIG. 1G).

Figure 2A:
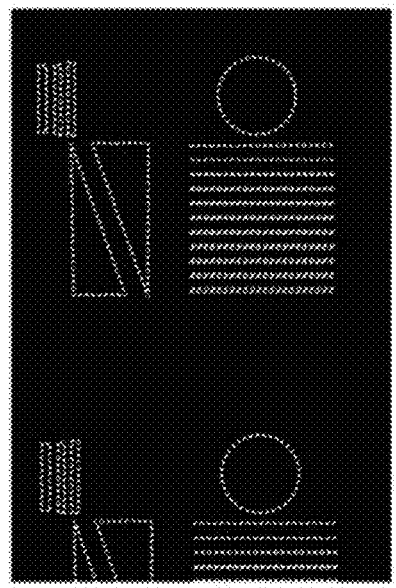
FIG. 2A-H. Resolution of implosion fabrication. (2A) Design of the resolution test pattern consisting of pairs of single-voxel-thick lines (bottom right of the pattern) along with a circle (top right of the pattern), two triangles (lower left of the pattern), and a number of bars indicating experiment number (top left of the pattern). The pattern (in full at top) was repeated (e.g., partially shown at bottom) over an extended area. (2B) Fluorescence image of the patterns generated by two-photon exposure of expanded gels using the design in (2A), with a 0.35 micron spot size (obtained with a 40× objective lens, and 0.6× optical zoom). To generate fluorescence images, patterns were generated using aminomethyl fluorescein and stained with Atto 647N. (2C) Fluorescence image of the pattern (red box from 2B) after the implosion process (0.075% crosslinker, 10× implosion). (2D) Bar graph of the isotropy of shrink for six 0.075% crosslinker ("10×", yellow) gels, and four 0.0172% crosslinker ("20×", blue) gels. Isotropy was defined as the ratio of the longest axis of patterned circles to the shortest axis in the shrunken state. Dots are measurements for individual circles within a single gel; bars indicate mean±standard deviation across individual circles within a single gel. Bars are rank ordered from left to right by degree of anisotropy, for each shrink factor. (2E) Fluorescence images of single-voxel lines before the implosion process. (2F) Scanning electron microscopy (SEM) images of single-voxel lines after 10× implosion. To generate contrast under SEM, patterns were created using fluorescein-cysteamine and then functionalized with 1.4 nm maleimido gold nanoparticles. (2G) Cross-sectional intensity profiles of the lines imaged by SEM (dashed lines), showing how full-width half-maxima (FWHM) of single voxel lines were measured. (2H) Linewidths, measured in G, for five different gel samples. Dots are measurements for individual lines; bars indicate mean±standard deviation across individual lines within a single gel.

To validate the resolution of implosion fabrication, a test pattern was designed containing pairs of single-voxel-thick (i.e., as patterned with a two-photon microscope performing line scans) lines to assess post-shrink resolution (FIG. 2A, B). Since such post-shrinkage features are by definition smaller than the diffraction limited voxel used to do the photopatterning, scanning electron microscopy (SEM) was used to assess the resolution post-shrink. 0.075% crosslinker concentration gel (10× implosion factor), and patterned with fluorescein-cysteamine was used to create SEM contrast, so that 1.4 nm diameter gold nanoparticles bearing a maleimide group could be added in the functionalization step.

Figure 7A:
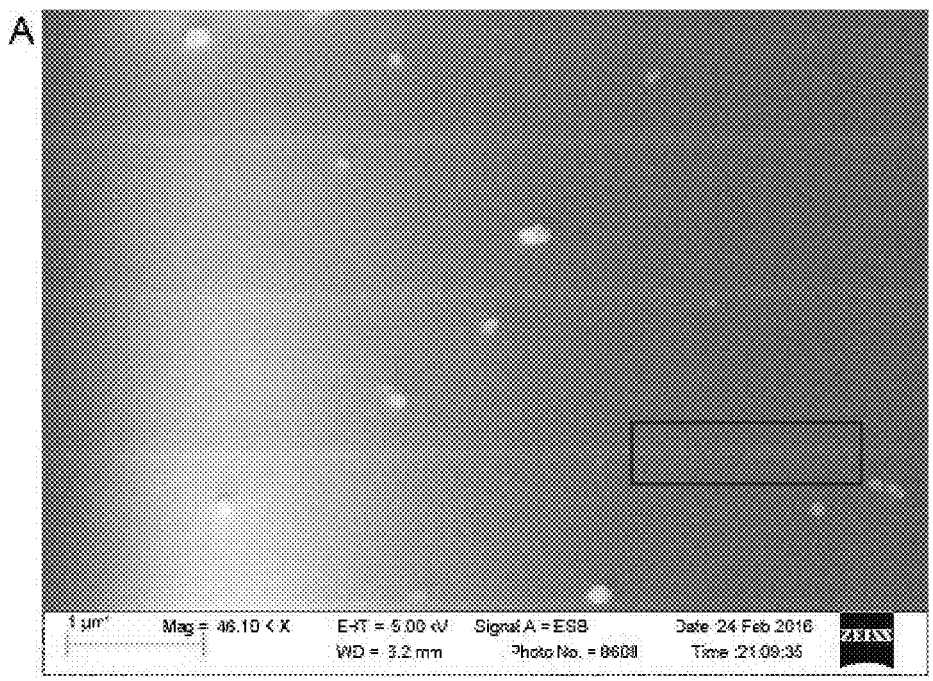
FIG. 7A-B. Raw SEM backscatter images, showing artifacts from charging. (7A) The full image used for FIG. 2F (top), before adjusting the contrast. Charging is evident as a region of high brightness on the left side of the image. Black box indicates the region from which FIG. 2F (top) was prepared. (7B) The full image used for FIG. 2F (bottom), before adjusting the contrast. Black box indicates the region from which FIG. 2G (bottom) was prepared.
Figure 7B:
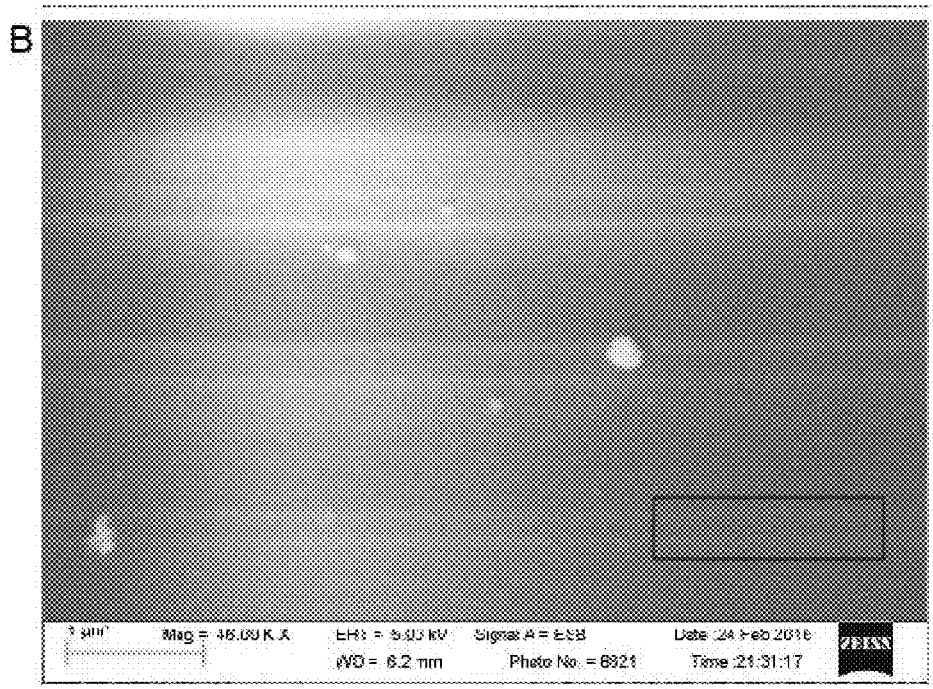

Resolution was estimated by measuring the line width (full width at half maximum) (FIG. 2E, F, G), and obtained a value of 59.6±3.8 nm (mean±standard deviation across samples; n=5; FIG. 2H) for 0.075% cross-linker concentration gels (10× shrink). Within-sample variations for individual lines were estimated (calculated as the standard deviation across lines within a sample), and found to be 8.3 nm (averaged across the 5 samples). These errors include any errors caused by charging of the gels under SEM, which alters contrast as noted above (FIGS. 7A, 7B). In attempting to measure the resolution with the 20×-shrinking gel (as demonstrated in FIG. 1), which could potentially push the resolution down to 30 nm or smaller, it was found that the lines did not present sufficient signal-to-noise to measure in SEM.

Figure 6:
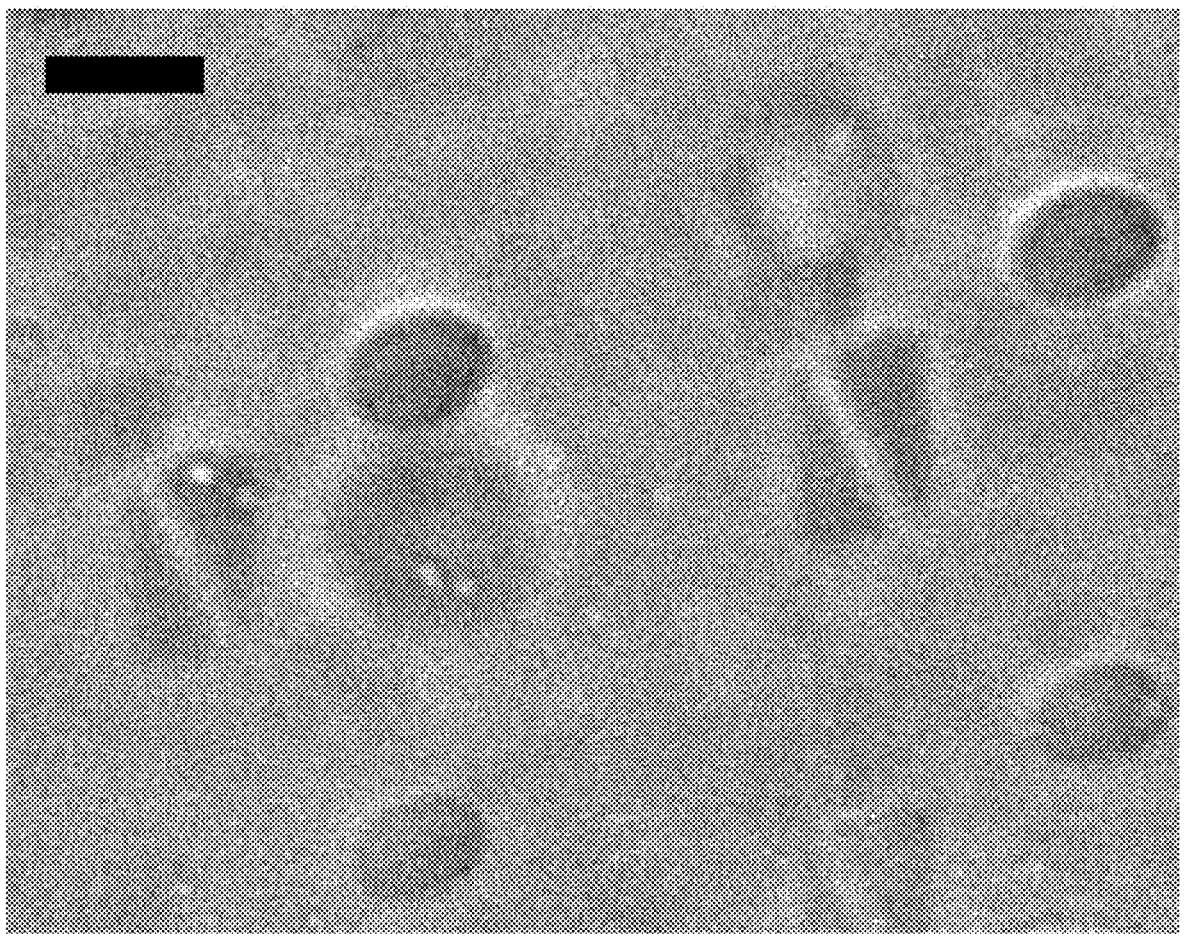
FIG. 6. Differential interference contrast image of shrunken gels (prepared as in FIG. 2A-C). The triangles and circle within the pattern are visible in the phase image; lines are less visible. (Some debris is observed.) Scale bar: 10 µm.

The isotropy of the implosion process (FIGS. 2C, 2D) was estimated by calculating the ratio of the longest diameter of the patterned circle, to the orthogonal diameter. The percent distortion thus calculated was 6.8±6.9% for 0.075% crosslinker concentration (mean±standard deviation, n=6 gels), and 8.2±4.3% for 0.0172% crosslinker concentration (n=4 gels). Thus the nanoscale resolution achieved over fine scales is matched with good feature preservation over longer length scales. It was estimated that binding sites could be patterned into the gel at concentrations around 10-100 μM in the expanded state, leading to a final concentration on the order of 0.1-1M in the shrunken state (FIGS. 5A-5F), or roughly $10^{20}$ binding sites per cubic centimeter. It was observed that altering the index of refraction of the shrunken gel through patterning (FIG. 6) was possible, potentially attributable the high density of binding sites.

Figure 3A:
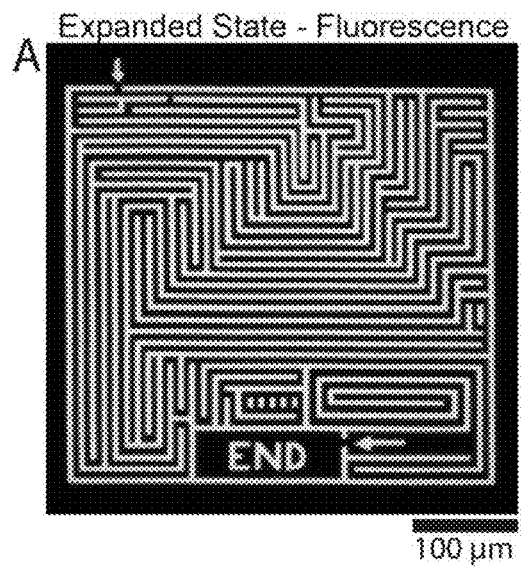
FIG. 3A-F. Realization of user-specified patterns with implosion fabrication. (3A) Fluorescence image of a sample bearing a maze pattern, before implosion, with Atto 647N used as the functionalization group. (3B) Fluorescence image of a sample with the same maze pattern of A, after 10× implosion. (3C) Fluorescence images of patterned aminomethyl fluorescein (blue), followed by serial functionalization with NHS-biotin, followed by streptavidin conjugated with a fluorophore (red, Atto 647N), and finally biotinylated DNA bearing an orthogonal fluorophore (green, Atto 565). Sample was imploded 3× (by immersion in a salt solution) before imaging. (3D) Maximum intensity projection of a three-dimensional face-segmented cube, patterned with aminomethyl fluorescein followed by functionalization with Atto 647N. This object was shrunken by a factor of 3× by immersion in phosphate buffered saline. (3E) Fluorescence image of patterned Alice in Wonderland image, followed by Atto 647N functionalization and shrinking by 10×. (3F) Fluorescence image of a part of a gel patterned over a 6 mm×6 mm×400 µm volume, in expanded form (left) and after 6× shrinking in a salt solution (right).
Figure 3B:
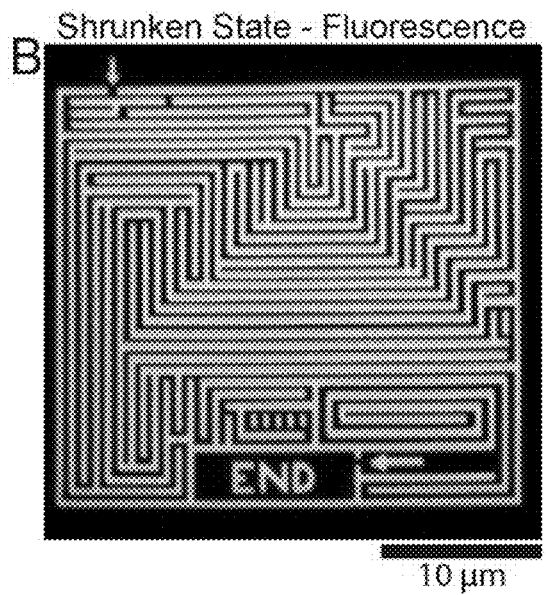
Figure 3C:
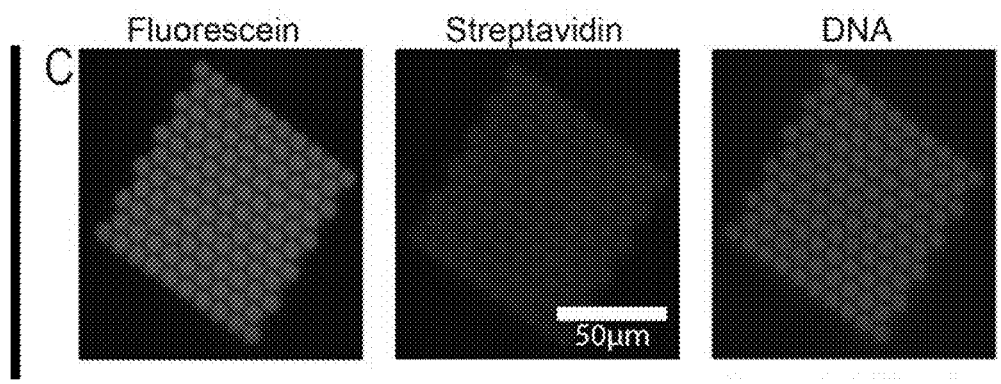

Having established both the resolutions achievable and the volumes addressable, it was necessary to demonstrate some examples of fabrication of 3-D patterns created without restrictions on the connectedness, periodicity, regularity, or aspect ratio of the patterns. Patterns were fabricated, such as a maze (FIGS. 3A, 3B), and an image of Alice in Wonderland (FIG. 3E). The generality of the patterning chemistry of implosion fabrication allows for diverse materials to be attached to the gel, even in series after a single patterning step. For example, after first functionalizing aminomethyl fluorescein patterns with NHS (N-hydroxysuccinimide ester)-biotin, a second functionalization was performed with fluorescent streptavidin, followed by a third round of biotinylated DNA (FIG. 3C). A face-segmented cube (FIG. 3D) was fabricated, as an example of a 3-D pattern. In short, the decoupling of patterning chemistry from functionalization chemistry enabled by the described modular shrinking process design can support a wide variety of final fabricated objects, with the potential for virtually unlimited extension both with more advanced optics as well as new functional groups.

Because diffraction limited optical patterning can go quite fast, driven by innovations in the field of high speed imaging, it was anticipated that large volumes could be rapidly patterned with conventional hardware. Using a commercially available two-photon microscope which scans femtosecond laser pulses across a sample with mirror galvanometers, a linear point scanning speed of 40 cm/s was achieved in expanded gels (using a lens/optical zoom combination that yielded 0.35 μm spot size); faster scanning using acousto-optic deflectors, resonant scanners, and other hardware could accelerate the scanning up to the fundamental limits of laser operation, or enable random-access scanning or patterning[17]. Even with a conventional microscope, objects were created with post-shrink dimensions spanning hundreds of microns to millimeters, with the laser scanning taking minutes to hours (FIG. 3F), with the speed determined by the volume and not the complexity of the pattern.

Experiments yielded specimens that are shrunken by $10^3$-$10^4$ fold in volume, which achieve a final resolution (as defined as FWHM of shrunken single-voxel lines) of ~60 nm. In principle, a combination of super-resolution optical patterning such as two-photon stimulated emission depletion (STED), followed by implosion, could improve the post-shrink resolution to ~2-5 nm. Hydrogels have previously been used as substrates for 2-photon photopatterning with diffraction limited resolution[18-22], allowing the current study to potentially extend a variety of earlier studies with nanofabrication capability. In addition, the functional materials utilized may be easily extensible beyond the nanoparticles, small molecules, and biomolecules here used, potentially enabling new kinds of optical metamaterial or electronic circuit to be created[23]. The demonstrated ability to create patterns made out of DNA might rapidly enable implosion fabrication to serve various roles including extending the range of fabrication of DNA nanostructures, and enabling creation of new kinds of DNA array for biotechnology[24-26].

Implosion fabrication combines top-down specification of binding locations with bottom-up assembly of materials inside the hydrogel. Implosion fabrication uses only common, commercially available photopatterning equipment and mild, aqueous chemical processes, yet achieves nanoscale 3D patterning. Uniquely among nanofabrication processes, in implosion fabrication, the voxel size is determined by the shrinkage of the substrate, not by the intrinsic physics of the patterning process, allowing us to break the diffraction limit for optical patterning. The ultimate resolution of implosion fabrication may be improved through further engineering of the hydrogel or the shrink process. Here, it is already shown that reducing the amount of crosslinker used in forming the gels allowed an increase in volumetric shrink factor by an order of magnitude. By tuning the gel components further, it may be possible to achieve yet greater shrink factors and hence smaller feature sizes.

Growth of 3D Metal Structures in the Gel—

Figure 8:
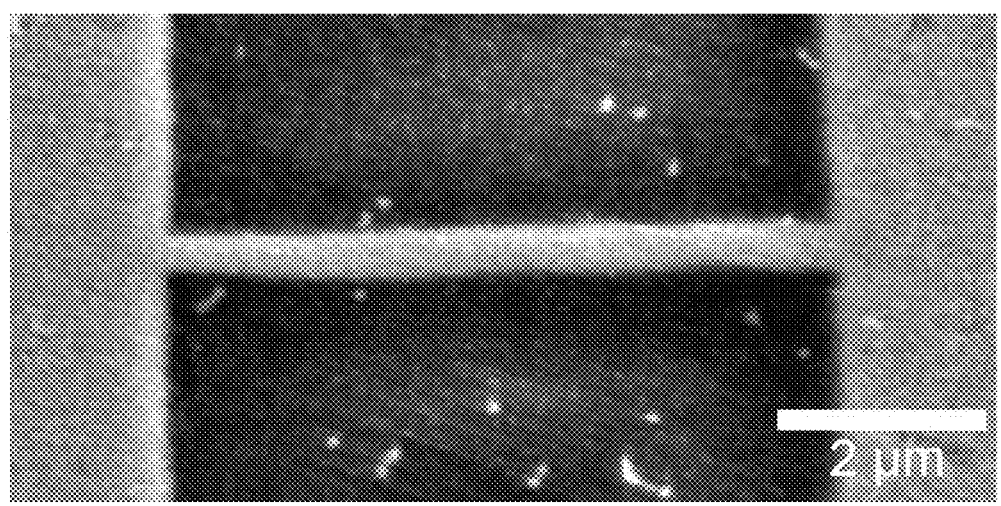
FIG. 8. A 200 nm silver nanowire, created by functionalizing reactive sites with metal nanoparticles.
Figure 9:
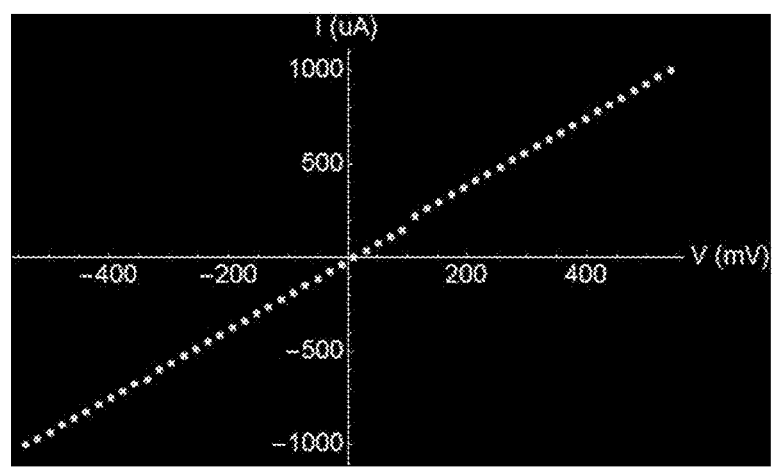
FIG. 9. An IV curve measured on the wire shown in FIG. 8.

Many functional devices can be created out of 3D metal structures. This includes antennas, electronic circuits, photonic metamaterials, and resonant cavities (including lasers). A process to metallize 3D patterns created inside the gel was developed. The gel is patterned using aminomethyl fluorescein. Following patterning, the gel is stained with an NHS-biotin conjugate, attaching biotin specifically to the amine groups on the patterned fluorescein. The gel is then stained with streptavidin carrying a 1.4 nm gold nanoparticle. Excess streptavidin is washed out of the gel. A silver enhancement solution is then applied that deposits silver on top of the gold nanoparticle. After immersing the gel in the silver enhancement solution, the 1.4 nm gold nanoparticle grows to approximately 20 nm in diameter. Then, upon shrinking the gel, the 20 nm nanoparticles come into close contact with each other (FIG. 8). Testing confirms conductivity across silver nanowires created in this way (FIG. 9). This opens the way to direct writing of arbitrary 3D metal structures with ~30 nm resolution.

Sintering to Create Solid Metal Structures—

The metallization process as described above results in the creation of very dense patterns of metal nanoparticles. However, the structures created in the way described above are not yet solid metal. In order to achieve the creation of solid metal structures, it is necessary to fuse the nanoparticles by sintering.

Examples of sintering that are compatible with previously described methods:

1. Application of electrical current across the metal structure. This superheats the metal instantaneously, allowing the nanoparticles to diffuse into each other. Testing shows that applying current of 100 uA-1 mA over 1 second is sufficient to cause sintering. The current may be applied using a probe station.
2. Illuminating the gel with a titanium sapphire laser at 780 nm. The laser is focused to a ~500 nm spot and scanned across the sample. Using approximately 60 mW of power at 780 nm, and illuminating each reactive site for approximately 1 microsecond provided the desired result. Three-dimensional structures may be sintered this way.
3. Plasma etching—when an enhanced sample is left inside an oxygen plasma cleaner/etcher for ten minutes the nanoparticles melt to form a solid metal structure.

Combined with etching, these methods will allow for the creation of free standing 3D metal structures which could open up possibilities for nano- and micro-electromechanical systems. The sintered material can also be made highly porous, and would thus be suitable for batteries.

Controlled Removal of Gel Material—

The processes described above result in solid metal structures that are nonetheless contained inside of the gel, which limits their utility for some applications. It was discovered that gel material may be selectively removed by exposing it with the 2-photon microscope at 780 nm. Two methods were tested:

1. Material is removed from the gel by exposing the gel to high laser power after it has been shrunken and dehydrated. This removes the gel material specifically in the region that was immersed. Experiments validated that it is possible to release solid metal structures created as described above from the gel. Experiments also showed that it is possible to remove material all the way through the gel in this way, i.e., to create holes in the gel.
2. Material is removed from the gel by exposing the gel with high laser power (~100 mW at 780 nm) while the gel is immersed in fluorescein. This removes the gel material in the region that is exposed, allowing creation of defined patterns where the gel has been removed. Moreover, these patterns are preserved through the shrinking process. This may be done both prior to shrinking and also after shrinking.

The first process provides a way to remove functional metallic structures from the gel following fabrication. The second process provides a way to create functional patterns on curved surfaces, which would be useful for the fabrication of functional metamaterials.

Alteration of the Refractive Index by Patterning—

One of the most promising applications of Implosion Fabrication is to the fabrication of optical metamaterials. In order to fabricate optical metamaterials, it is important to be able to control the refractive index of the material with sub-wavelength resolution. It was discovered that the patterning process results in a change in the refractive index of the gel substrate following shrink (See FIG. 16). This allows us to directly write refractive index gradients into the substrate.

Semiconductors—

For many technological applications, it is important to be able to create patterns both of metals and of semiconductor materials. This is important in the electronics industry for the creation of functional devices such as transistors and LEDs, and also in the photonics industry, because semiconductors have high indices of refraction and are thus useful for creating photonic devices in which functional properties are derived from nanoscale patterning of the index of refraction.

A way to attach semiconductor nanoparticles (specifically cadmium telluride and cadmium selenide) to the previously described polymer gel material in defined patterns. The protocol is similar to the previously described method used to anchor gold nanoparticles to the gel, but rather than using a streptavidin reagent with an attached gold nanoparticle, we use a semiconductor quantum dot, that consists of a semiconductor nanocrystal passivated with a polymer, and functionalized with streptavidin molecules. This reagent (which is obtained commercially) is washed into the gel following the biotinylation step. The presence of semiconductors inside of the gel is confirmed by fluorescence imaging, since the semiconductor nanoparticles are fluorescent. Moreover, the nanoparticles remain in the gel through the shrinking in, for example, 200 mM HCl. At the moment, however, dehydration appears to be incompatible with this semiconductor anchoring approach.

Semiconductor nanoparticles could be used as optical gain media, allowing creation of lasers with spatially structured gain media, with a range of interesting optical effects. They could also be used to change the index of refraction, allowing for the creation of photonic metamaterials. Finally, if the semiconductors can be made solid, they could be used in the creation of electronics.

As in the case of the described metal growth process, in which silver is grown on top of gold nanoparticles in order to create solid silver structures, solid semiconductor structures may be created in which a semiconductor would be grown on top of the embedded cadmium telluride or cadmium selenide nanoparticles.

Multiplexed Patterning—

Many functional devices are composites of multiple different materials, and take advantage of the interactions between those materials. For that reason, it is important for Implosion Fabrication to be able to pattern multiple different materials into the same substrate. Patterning of multiple different kinds of Streptavidin into the polymer gel over subsequent rounds of patterning was achieved. To do so, previously described methods (without shrinking) were applied using one kind of streptavidin. The polymer gel is washed again with a patterning solution and the same methods applied, this time using a different kind of streptavidin. Testing verified that the first kind of streptavidin only binds to the patterns created in the first round, whereas the second kind of streptavidin binds primarily to the patterns created in the second round.

Streptavidin is used to anchor metals and semiconductors into the gel. Thus, multiple different kinds of streptavidin may be patterned into the gel in order to pattern metals and semiconductors simultaneously into the gel.

An optional method provides for the attachment of two functional materials to the polymer gel in parallel rather than successively. To achieve this, two fluorophores that have orthogonal 2-photon absorption spectra (i.e., they undergo 2-photon absorption at different wavelengths) are used. An example of such fluorphores are Fluorescein patterned at 780 nm and Alexa 350 patterned at 950 nm. Thus, it is possible to create patterns with one fluorophore using one wavelength, and with the second fluorophore using a different wavelength. By attaching different reactive groups to each fluorophore, it will be possible to attach two distinct functional materials into the gel in distinct patterns using the previously described methods.

Methods

Gel Synthesis:

Gels were synthesized following the protocol outlined in ExM (9). The monomer solutions are mixed from stock solutions of 10×PBS, 5M NaCl, 38% (w/w) sodium acrylate, 50% (w/w) acrylamide, and 2% (w/w) N,N'-methylenebisacrylamide in concentrations given below for the "Stock I" (10× shrink), "Stock II," and "Stock O" (20× shrink) monomer solutions. Solutions were aliquoted and stored at −20° C. Prior to casting, monomer solution was cooled to 4° C. to prevent premature gelation. Concentrated stocks of ammonium persulfate (10% w/w) and tetramethylethylenediamine (TEMED) (10% v/v) were diluted 50× into the monomer solution. The resulting gelation solution was then mixed thoroughly and added to a gel mold that was ~0.17 mm tall and ~1 cm wide. Molds consisted of a glass slide for the bottom and a No. 1.5 coverslip for the top, using two additional coverslips as spacers. The mold was placed at 37° C. for 1 hour to allow for gelation. Following gel synthesis, the gel was washed in 500× its volume in water on five successive 15 minute wash steps to ensure full expansion.

| Component: | Stock Conc. | Amount (mL) | Final Conc. |
|---|---|---|---|
| Stock I (1.04x): | | | |
| Sodium acrylate | 38% | 2.25 | 8.6 |
| Acrylamide | 50% | 0.5 | 2.5 |
| Bis | 2 | 0.375 | 0.075 |
| NaCl | 5M | 4 | 2M |
| 10x PBS | 10x | 1 | 1x |
| Water | | 1.475 | |
| Final | | 9.4 | |
| Stock II: | | | |
| Sodium acrylate | 38% | 3.7 | 14% |
| Acrylamide | 50% | 0.825 | 4.125% |
| Bis | 2% | 0.075 | .015% |
| NaCl | 5M | 4 | |
| 10x PBS | 10x | 1 | |
| Water | | 0 | |
| Final | | 9.6 | |
| Stock O: 20x shrink | | | |
| Sodium acrylate | 38% | 2.25 | ~8.6 |
| Acrylamide | 50% | 0.5 | ~2.5 |
| Bis | 2 | 0.075 | ~0.015 |
| NaCl | 5M | 4 | 2M |
| 10x PBS | 10x | 1 | ~1x |
| Water | | 0.09 | |
| Final | | ? | |

Preparation for Patterning:

Following expansion, gels were transferred into a glass-bottom dish (Mattek, P50G-1.5-30-F) and incubated in patterning solution for 30 minutes, as follows. Following incubation, a coverslip was placed over the well of the glass-bottom plate and gel and excess patterning solution was withdrawn, so the coverslip pressed the gel against the bottom of the plate and reduced drift.

For patterning gold nanoparticles or maleimide-activated fluorophores into the gel, as in FIGS. 2B, 2C,2E-2H, 3F, 4. 6 and 7, the patterning solution was made by reacting fluorescein-NHS (Life Technologies, 46409) to cysteamine (Sigma Aldrich, M9768-5G) at 1 mM concentration in water for at least 30 minutes prior to incubation.

For patterning NETS-activated fluorophores or reagents into the gel, as in FIGS. 1D, 1E, 1H, 3A-3E, and 5A-5F the patterning solution consisted of 100 µM 5-aminomethyl fluorescein hydrochloride (Life Technologies, A-1353) in water.

Patterning:

Gels were patterned using an inverted Zeiss LSM 710 confocal microscope with a Chameleon Ultra II femtosecond pulsed IR laser set to 780 nm, using a 40×1.1 NA or 25×0.8 NA water immersion objective. Within the Zen software, custom ROIs were defined for acquisition. The surface of the gel was identified by a decrease in fluorescence relative to the external patterning solution. Standard patterning conditions were 0.79 µs pixel dwell time and a pixel size of 350 nm, amounting to a patterning speed of 44 cm/s. Laser power varied depending on the intensity of patterning desired. Each line could be scanned multiple times to increase the patterning intensity, using the line averaging feature in the Zen software. Prior to and following patterning, the sample was visualized by excitation at 780 nm using 2% laser power.

Figure 1D:
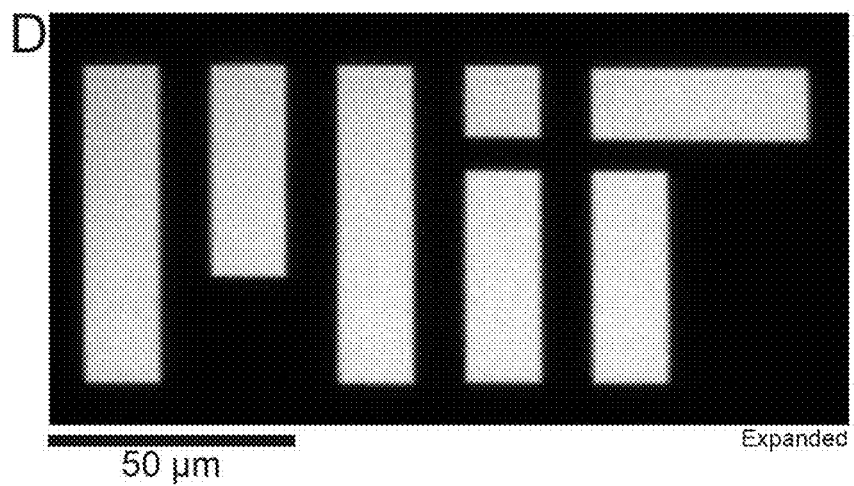
Figure 1E:
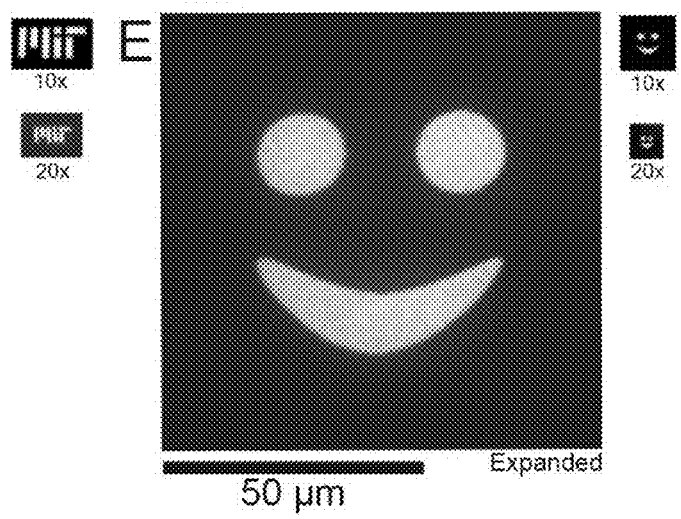
Figure 1F:
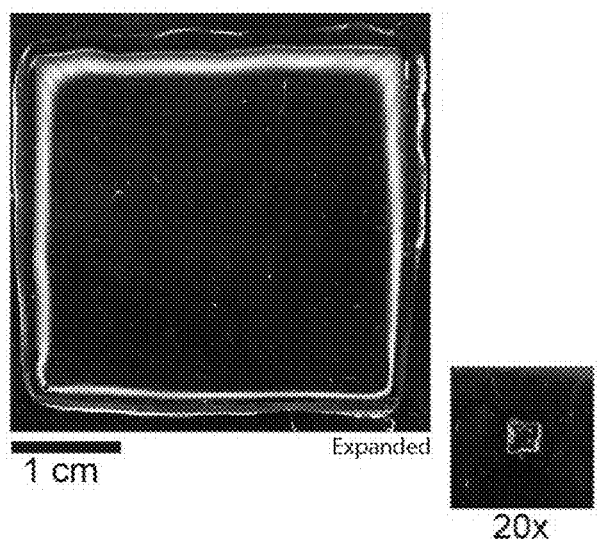
Figure 1G:
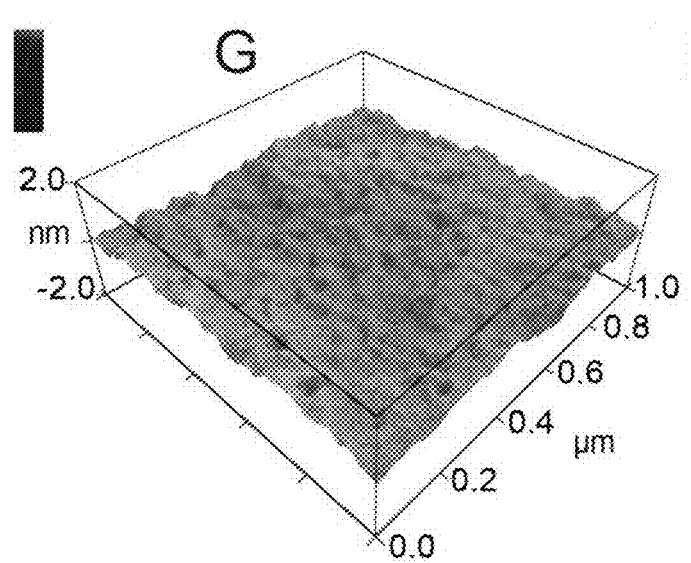

For patterns in FIG. 1D, E, 17.7% laser power was used with the 25× objective and 1× line scanning.

Figure 2B:
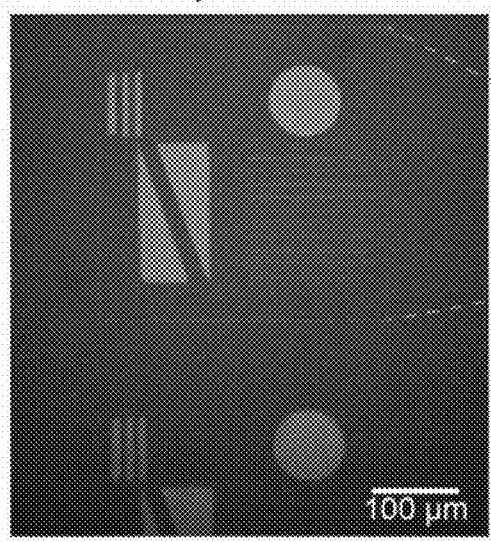
Figure 2C:
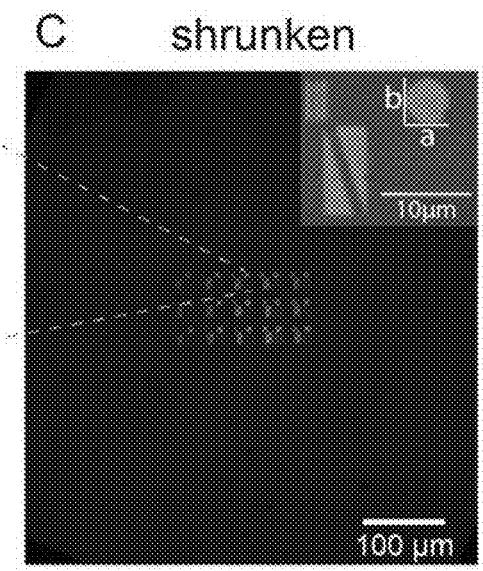

For patterns in FIG. 2B, C, each line was scanned either once or twice using the 40× objective, with variable laser power. The condition was indicated by tick marks above and to the right of the triangles, as follows: 1 tick mark, 12.5% laser power with 1× line scanning. 2 tick marks, 12.5% laser power with 2× line scanning. 3 tick marks, 17.7% laser power with 1× line scanning. 4 tick marks, 17.7% laser power with 2× line scanning. 5 tick marks, 25% laser power with 1× line scanning.

For patterns in FIGS. 2E, 2F, 2G, 2H, 4 and 6, 17.7% laser power was used with 2× line scanning. To ensure that the patterns were at the surface of the gel for SEM visualization, the patterns were generated as Z stacks with 2 µm step size beginning below the surface of the gel and extending 50 µm into the gel.

Figure 2D:
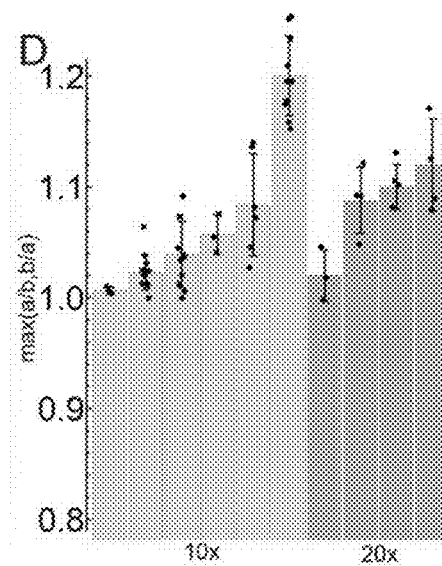
Figure 2E:
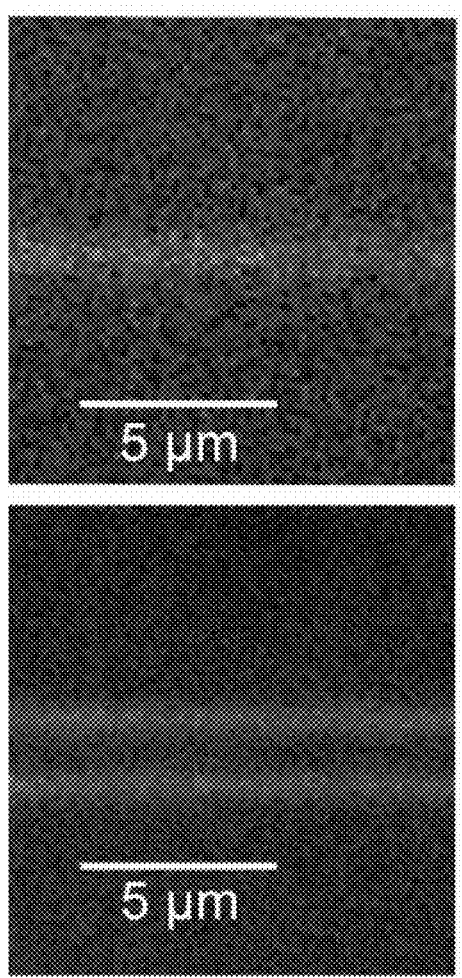
Figure 2F:
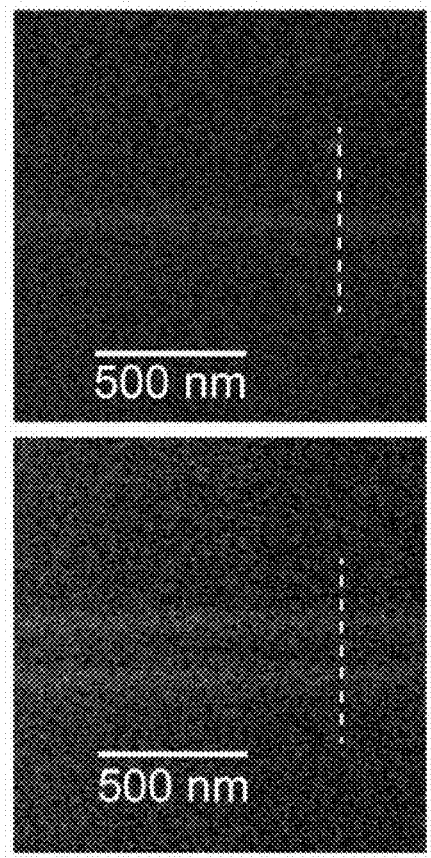

For patterns in FIGS. 2A and 2D, several different squares were patterned using 4%, 6%, 8%, 12%, 14%, 16%, 18%, 20%, 25%, 30%, 35%, 40%, 50%, 60%, and 70% laser power, with either 1×, 2×, or 4× line scanning. For patterns in FIGS. 5B and 5E, the same pattern was used with the same laser intensities, but created a 20 µm Z-stack with 2 µm spacing. The laser power at the sample was measured using a power meter (PM100D) and scan head (S170C) from Thor Labs.

Figure 3D:
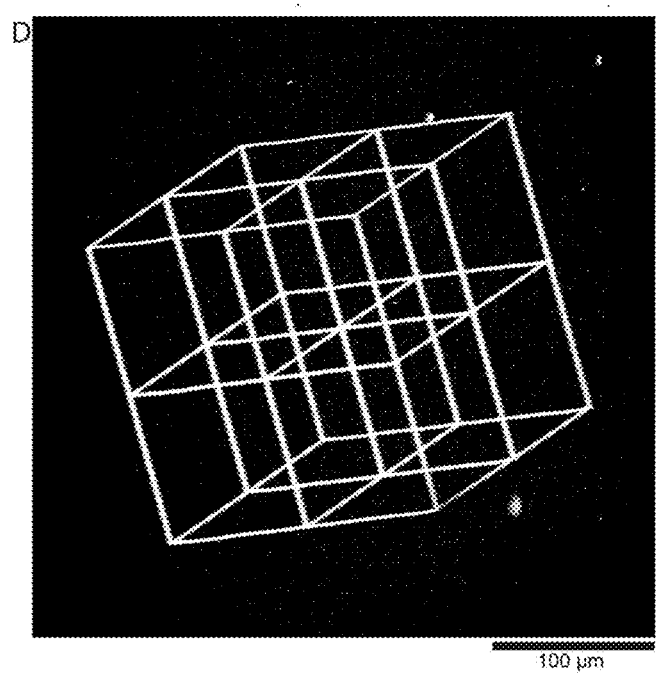
Figure 3E:
Figure 3F:
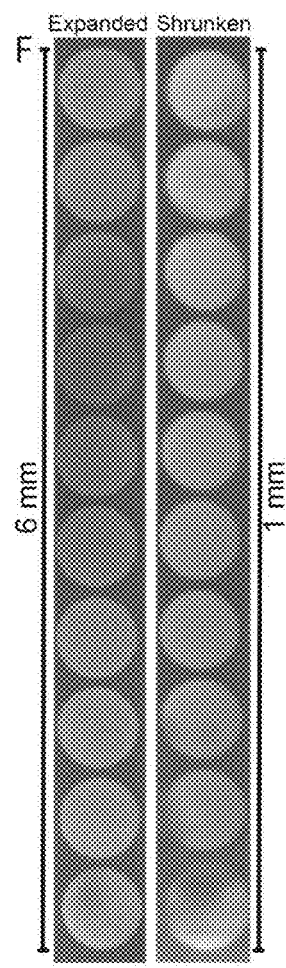

For patterns in FIGS. 3A, 3B, 3C, 3E, 3F, 17.7% laser power was used and 1× line scanning with the 25× objective. Each pattern was created as a Z stack with 2 µm step size beginning below the surface of the gel and extending 50 µm into the gel. FIG. 3F was patterned using the tile scan feature in the Zen software over a period of approximately 8 hours to achieve a region spanning 6 mm×6 mm×400 µm in the pre-shrink state.

FIG. 3D was patterned using 17.7% laser power and 1× line scanning on the 25× objective, in two phases. First, the vertical lines were patterned using a Z stack with 2 µm step size extending 400 µm into the gel. Subsequently, three planar grids were patterned at the top, midpoint, and bottom of the Z stack, using the same patterning conditions.

For altering the refractive index, gels were patterned using 17.7% laser power and 2× line scanning on the 40× objective.

For removal of the material while it was still infused with the patterning reagent, stock II was used for the gel material, and the gel was patterned with 25% laser power and 2× line scanning on the 40× objective.

Functionalization:

Each patterning reagent was stained with a specific and complementary chemistry depending on the functional group patterned into the gel. Following patterning, the gels were washed five times in water for fifteen minutes each time to remove excess patterning solution.

For functionalizing fluorescein-cysteamine with maleimide-activated gold nanoparticles, as in FIGS. 2E, 2F, 2G, 2H and 7, gels were washed twice in 1×PBS for 15 minutes each time. Subsequently, maleimide-functionalized 1.4 nm gold nanoparticles (Nanoprobes, 2020A) were diluted to 5 µM concentration in 1×PBS and washed onto the gel overnight. Gels were then washed twice in water for at least 30 minutes each time, transferred to a new container, and washed in water three more times for at least 30 minutes each time to remove excess gold.

For functionalizing fluorescein-cysteamine with maleimide-activated Atto 647N, as in FIGS. 2B, 2C, 3F and 6, gels were washed twice in 1×PBS for 15 minutes each time. Subsequently, Atto 647N-maleimide (Sigma-Aldrich, 05316-1 mg-F) was diluted to 50 µM concentration in 1×PBS and washed onto the gel overnight. Because Atto 647N is positively charged and thus tends to partition into the negatively charged gel, gels were then washed twice in 200 mM NaOH for at least 30 minutes each time, followed by three washes in 1×PBS for 30 minutes each time. Gels were then washed three times in water, for 15 minutes each time, to remove salt and prepare them either for imaging or shrinking. When staining with a negatively charged fluorophore, washes in NaOH and PBS were replaced with washes in water.

For functionalizing aminomethyl fluorescein with Atto 647N-NHS, as in FIGS. 1D, 1E, 3A, 3B, 3C, 3D, 3E and 5A-5F, gels were washed twice in 1×PBS for 15 minutes each time. Subsequently, Atto 647N-NHS (Sigma-Aldrich, 18373-1 mg-F) was diluted to 50 µM concentration in 1×PBS and washed onto the gel for at least 4 hours. As above, gels were then washed in 200 mM NaOH twice for at least 30 minutes each time, followed by three washes in water for 15 minutes. After staining aminomethyl fluorescein with a negatively charged dye, excess dye could simply be washed out in water.

For FIG. 3C, gels were functionalized with biotin NHS (Life Technologies, 20217) at 1 mM concentration in 1×PBS overnight, followed by three washes in water and two more washes in 1×PBS to remove excess reagent and prepare for the streptavidin functionalization. Atto 647N-labeled streptavidin (Sigma-Aldrich, 94149-1 mg) was then washed onto the gel at 40 µg/ml in 1×PBS with 3% Bovine Serum Albumin overnight. The gel was then washed in 2.5 mM Tris-HCl, pH 8, three times for at least 1 hour each time to remove excess streptavidin. Streptavidin functionalized gels could then be functionalized with DNA by washing the gels in a solution with 10 µM biotinylated DNA in 1×PBS for 3 hours. DNA was subsequently removed by washing in water 3 times, for at least 15 minutes each time. Alternatively, gels could be patterned with biotin-4-fluorescein as described elsewhere (17), in which case a similar protocol was followed for attachment of streptavidin to the gel.

For functionalizing aminomethyl fluorescein with gold nanoparticles for the purpose of subsequent creation of solid metal structures, gels were functionalized with biotin NHS (Life Technologies, 20217) at 100 uM concentration in 1×PBS for 3 hours, followed by four washes in water and two more washes in 1×PBS to remove excess reagent and prepare for streptavidin functionalization. Subsequently, the fluoronanogold reagent (Nanoprobes, #7416) was diluted by a factor of 30 into 1×PBS and washed onto the gel overnight. Subsequently, the gel was washed four times in 0.1×PBS for at least 1 hour each time, and was then washed twice in water. The LI silver enhancer reagent (Nanoprobes, #2013) was then washed onto the gel for an a variable amount of time between 50 and 70 minutes. Gels were then rinsed with water and washed three times in water, for at least 15 minutes each time.

For functionalizing aminomethyl fluorescein gels with semiconductor nanoparticles, gels were functionalized with biotin NHS (Life Technologies, 20217) at 100 uM concentration in 1×PBS for 3 hours, followed by four washes in water and two more washes in 0.1×PBS to remove excess reagent and prepare for streptavidin functionalization. The QDot 585 streptavidin conjugate (Life Technologies, Q10111MP) was then diluted by a factor of 50 into 0.1×PBS and washed onto the gel for at least 24 hours. The gel was then washed 3 times in 0.1×PBS, and optionally twice in water.

Shrinking:

Gels were shrunken either using acid or using salt. For all gels in FIGS. 1, 2, 3A, 3B,3D, 3E, 4, 6, and 7, gels were transferred to a glass container and were shrunken by washing in 2 mM HCl with 0.05% Tween-20 for 2 hours. Gels were then washed in 20 mM HCl with 0.05% Tween 20 for 2 hours, or until shrinking had stopped. Finally, gels were washed in 200 mM HCl for one hour, to remove residual Tween-20. Gels were then dehydrated for 30 minutes, or until completely dry. Remarkably, streptavidin remained in the gel during the shrinking process.

For FIGS. 3C and 3D, the gel was shrunken by three washes in 1×PBS, for at least 15 minutes each time, to allow imaging with a standard diffraction-limited microscope.

For FIG. 3F, the gel was shrunken (but not dehydrated) by washing three times in a solution of 1M MgCl2 and 1M CaCl2, for 10 minutes each time.

Sintering:

For sintering the gel after shrinking and dehydration, the shrunken and dehydrated gel was exposed to the 2-photon laser using 5% laser power, 1× line scan, and 0.79 us dwell time at a wavelength of 780 nm.

Gel Removal:

For removing the gel after shrinking and dehydration, the shrunken and dehydrated gel was exposed to the 2-photon laser using 10% laser power, 4× line scanning, and 3.6 us dwell time at 780 nm. Repeating this exposure would cause more gel material to be removed. By repeating these exposure conditions many times, it was possible to etch all the way through the gel.

Imaging:

For FIGS. 1D, 4, 5, 6, 2B, 2C, 2D, 2E, and 2H, fluorescence and differential interference contrast imaging in both the expanded and shrunken states was performed using a Perkin Elmer spinning disk (CSU-10 Yokogawa) confocal microscope. A Hamamatsu Orca-ER cooled CCD camera, and either a 10×0.3 NA objective or a 40×1.15 NA long working distance water-immersion objective (Nikon) were also used.

For FIGS. 1E, 1F, 3A, 3B, 3D, and 3E fluorescence imaging in both the expanded and shrunken states was performed using a Zeiss LSM 710 (1E, F, 3A,D) or Zeiss LSM 880 with Airyscan (1E-10×, 3B). On the LSM 710, a 25×0.8 NA water immersion objective was used. On the Zeiss LSM 880, a 63×1.3 NA oil immersion objective with Airyscan deconvolution was used.

FIGS. 3C and 3F were acquired on a widefield epifluorescence microscope, using an Andor Neo Zyla and either a 4×0.2 NA (FIG. 3F), or 40×1.1 NA water immersion (FIG. 3C) objective.

When imaging dehydrated gels, gels were mounted on carbon tape and placed either in 200 mM HCl or mineral oil (according to the immersion medium of the objective) to eliminate any air gap between the gel and the coverslip. This did not cause the gel to re-expand.

Scanning electron microscope images of the AuNP patterns (FIGS. 2F, 2G, 7A and 7B) were taken using a FE-SEM (UltraPlus, Zeiss) with an Energy selective Backscattered (EsB) detector. The atomic force microscopy (AFM) of the gel surface was taken with tapping mode in air (Cypher ES, Asylum Research) with a silicon probe (AC240TS, Olympus). The SEM image of the gel surface and cross-section was taken with a FE-SEM (UltraPlus, Zeiss) with an inlens detector.

Figure 1H:
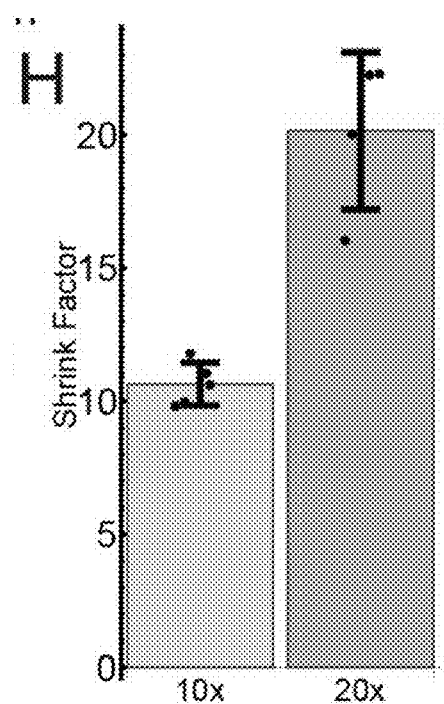
Figure 4:
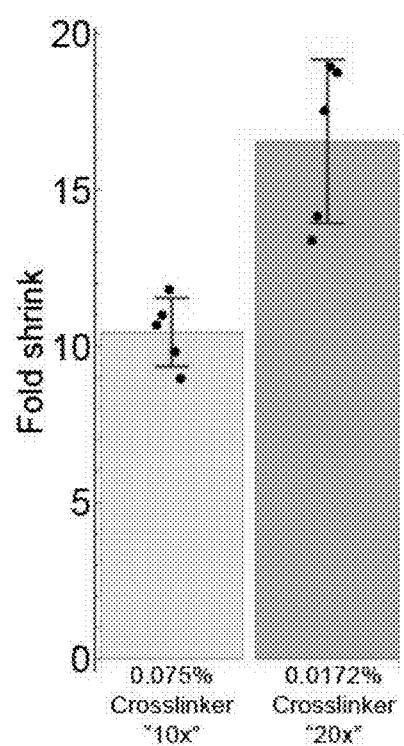
FIG. 4. Linear shrink factors measured for gels patterned with fluorescein-cysteamine, with 10× and 20× gels (n=5 each). Mean±standard deviation is plotted, with dots indicating individual gels. Fluorescein-cysteamine solution was observed to cause the 0.0172% crosslinker gels to shrink slightly when delivered in the expanded state.
Figure 5A:
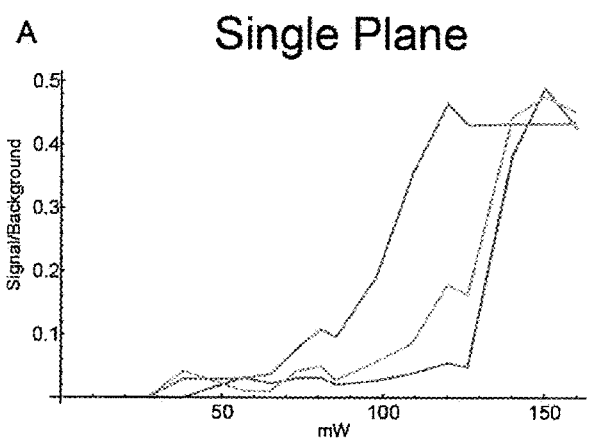
FIG. 5A-F. Patterning intensity as a function of the laser power and line scanning. During patterning, bleaching of fluorescein was observed in the patterned region, followed by fluorescence recovery. Remarkably, some percentage of fluorophores retained their fluorescence even after covalently binding to the gel, leaving behind an immediate visual confirmation of patterning ("fluorescein ghosts") and allowing us to estimate a lower bound on the concentration of binding sites produced during patterning. By comparing the brightness of the patterned region to the background, a lower bound on concentration can be derived. The concentration of molecules that could subsequently be bound to the gel, in the functionalization step, as judged from the fluorescence of Atto 647N-NHS bound to patterns of aminomethyl fluorescein, was found to be controllable by varying the laser power used during patterning, or by scanning each line of the pattern multiple times. Above a certain power, however, the fluorescence of fluorescein patterned into the gel saturated, and the fluorescence of Atto 647N bound to the fluorescein decreased. It is unclear whether this is the result of an effect on the patterning process at higher laser powers, or a consequence of having very high concentrations of Atto 647N. The power necessary to observe saturation depended on a variety of factors, such as the pixel dwell time and the number of times each voxel was exposed during patterning. The fluorescence of bound aminomethyl fluorescein observed by excitation at 780 nm immediately after patterning, given as a signal to background ratio, for the case of rastering over a single plane (5A), or rastering over a Z stack with 2 µm Z steps (5B). (5C) An example pattern used to generate the plots shown in (5A) and (5B); each square corresponds to a different laser power. (The square in the upper right corner was excluded from analysis, because it was patterned with an incorrect laser power.) (5D,5E) The fluorescence of bound Atto 647N after attachment to the amine groups patterned in (5A) and (5B). (5F) Example pattern showing fluorescence of bound Atto 647N.
Figure 5B:
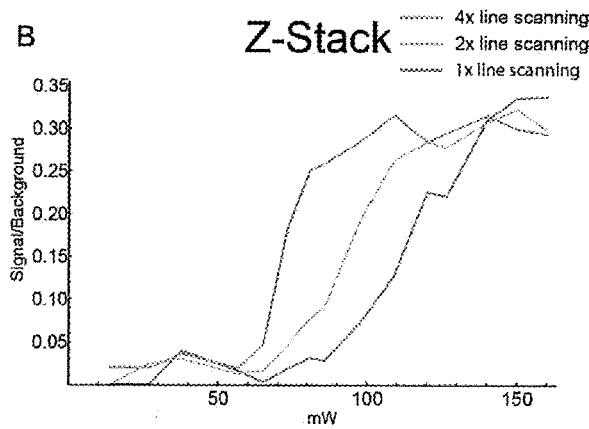
Figure 5C:
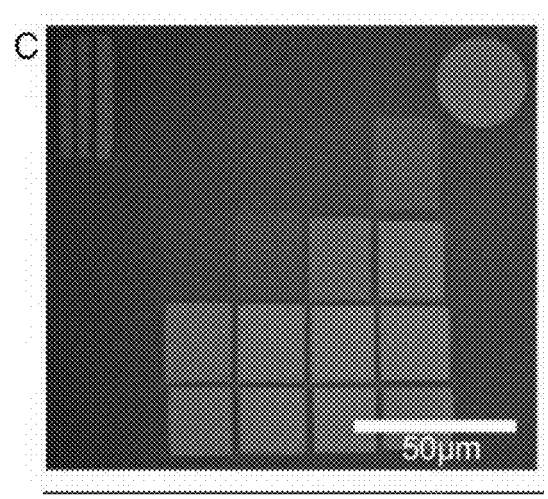
Figure 5D:
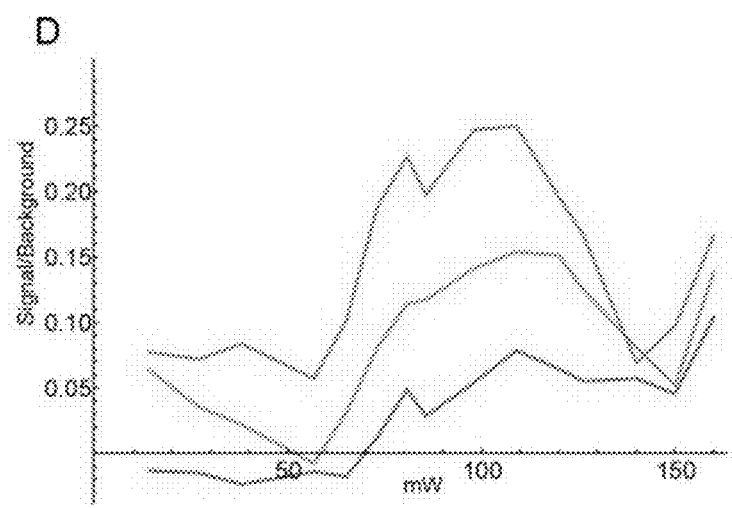
Figure 5E:
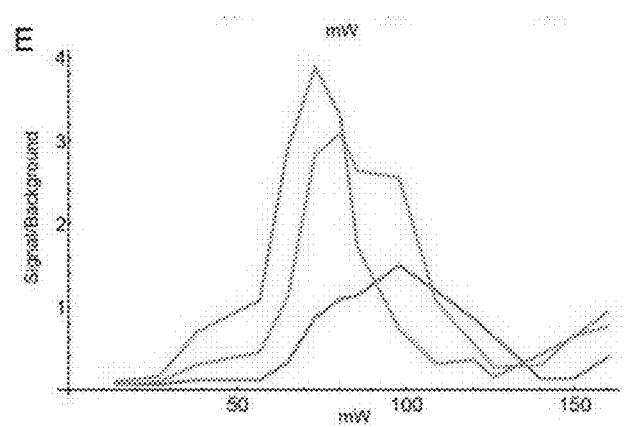
Figure 5F:
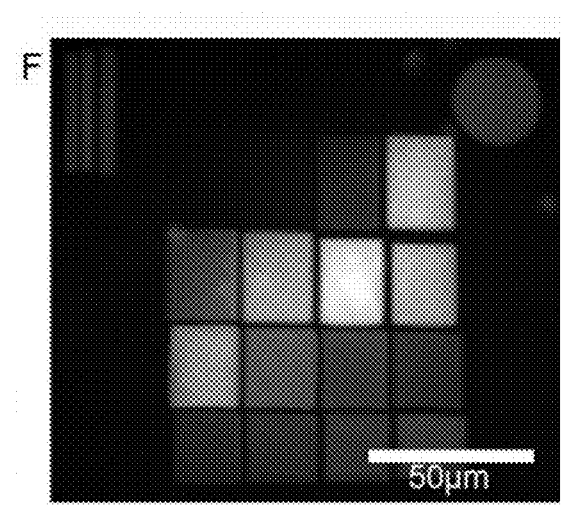

Analysis:

FIGS. 1H and 4: Data for FIGS. 1H and 4 were obtained by comparing the feature sizes of patterns as specified on the patterning microscope to the size of patterns after shrinking. Samples were chosen on the basis of the availability of high-resolution optical or SEM images of the shrunken state, and came from a variety of different experiments.

FIG. 2D: Isotropy was measured for samples into which circles had been patterned. The isotropy was measured by visually determining the longest axis of the circle, and comparing the diameter on that axis to the diameter on the orthogonal axis. A mixture of gels patterned with aminomethyl fluorescein and fluorescein-cysteamine were used. Gels were chosen for inclusion in the dataset on the basis of the availability of images for analysis, prior to measuring the isotropy. No gels were excluded.

Figure 2G:
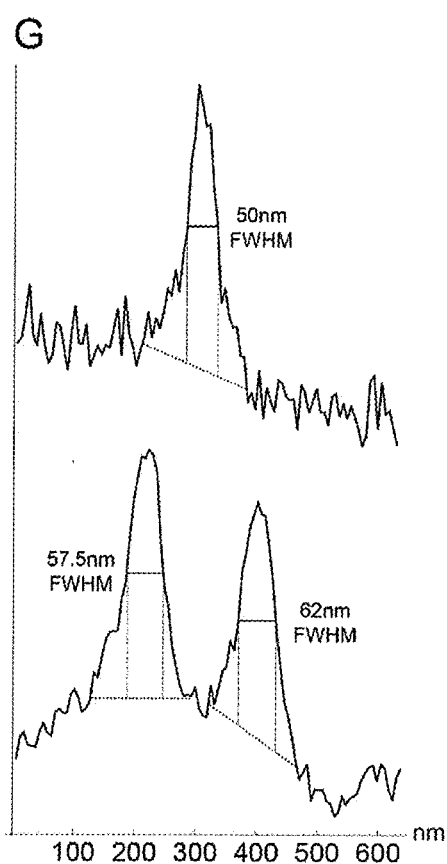
Figure 2H:
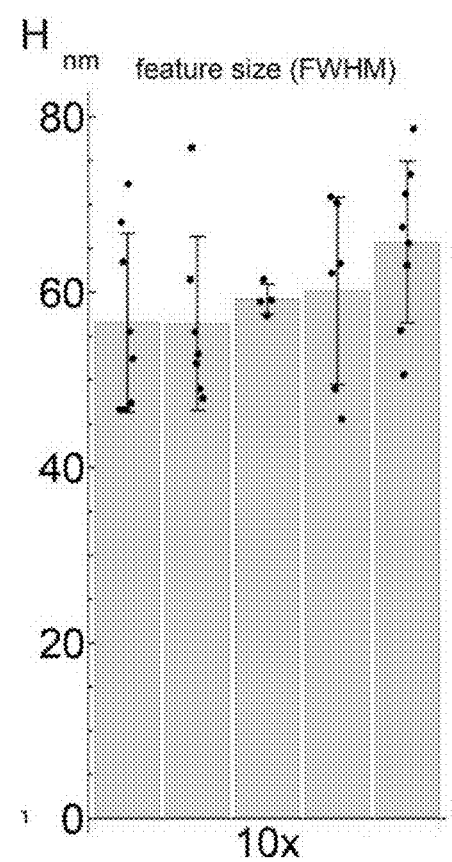

FIGS. 2G and 2H: The widths of lines visualized with SEM were measured by using ImageJ to rotate the image so that the lines were oriented vertically, and then taking the mean pixel value over the vertical dimension for a clean segment of line. The average was performed over the longest clean segment of line available in the image, usually several hundred pixels. The full width at half maximum (FWHM) was then measured in pixels, and converted into a distance using the scale bar provided by the SEM imaging software. The baseline used in the FWHM measurement was found by linear interpolation between the baseline levels immediately on either side of the line profile (FIG. 2G). A vertical line was drawn between the highest point in the profile and the interpolated baseline, and the midpoint of this line was chosen as the half-maximum. Lines were excluded from our analysis when the magnitude of the background (for example due to charging) prevented a determination of the FWHM. In addition, a subset of the lines in the resolution pattern were excluded in every gel due to a consistent and reproducible error in the Zen software that caused an extra line to be patterned directly below those lines, leading to a larger FWHM. It was reasoned that these lines could be excluded because they represent a limitation of the software rather than a limitation of the patterning and shrinking process.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. It should also be understood that the preferred embodiments described herein are not mutually exclusive and that features from the various preferred embodiments may be combined in whole or in part in accordance with the invention.

REFERENCES

1. Meza, L. R., Das, S., & Greer, J. R. (2014). Strong, lightweight, and recoverable three-dimensional ceramic nanolattices. *Science,* 345 (2014).
2. Tumbleston, J. R., et al. Continuous liquid interface production of 3D objects. *Science,* 347 (2015).
3. Whitesides, G. M. The origins and the future of microfluidics. *Nature* 442 (2006).
4. Feynman, R. P. There's plenty of room at the bottom. *Engineering and science* 23 (1960).
5. Qi, M. et al. A three-dimensional optical photonic crystal with designed point defects. *Nature* 429 (2004).

6. Zhao, X. M. et al. Fabrication of microstructures using shrinkable polystyrene films. *Sensors and Actuators A: Physical*, 65, 209-217 (1998).
7. Zhao, X. M. et al. Fabrication of polymeric microstructures with high aspect ratios using shrinkable polystyrene films. *Advanced Materials*, 9, 251-254 (1997).
8. Zhang, B., Zhang, M., & Cui, T. Low-cost shrink lithography with sub-22 nm resolution. *Applied Physics Letters* 100, (2012)
9. Bauer, J. et al. Approaching theoretical strength in glassy carbon nanolattices. *Nature Materials* 15, 438-443 (2016)
10. Ilmain, F., Tanaka, T., & Kokufuta, E. Volume transition in a gel driven by hydrogen bonding. *Nature* 349, 400-401 (1991).
11. Shibayama, M. & Tanaka, T. "Volume phase transition and related phenomena of polymer gels." Responsive gels: volume transitions I. Springer Berlin Heidelberg, (1993).
12. Flory, P. J. Principles of polymer chemistry. Cornell University Press, (1953).
13. Tanaka, T. et al. Collapse of gels in an electric field. *Science* 218, 467-469 (1982).
14. Chen, F., Tillberg, P. W., & Boyden, E. S. Expansion microscopy. *Science* 347, 543-548 (2015).
15. Hecht, A. M., Duplessix, R. & Geissler, E. Structural inhomogeneities in the range 2.5-2500 angstroms in polyacrylamide gels. *Macromolecules* 18, 2167-2173 (1985).
16. Calvet, D., Wong, J. Y. & Giasson, S. Rheological monitoring of polyacrylamide gelation: Importance of cross-link density and temperature. *Macromolecules* 37, 7762-7771 (2004).
17. Iyer, V., Hoogland, T. M. & Saggau, P. Fast functional imaging of single neurons using random-access multiphoton (RAMP) microscopy. *Journal of Neurophysiology* 95, 535-545 (2006).
18. Skylar-Scott, M. A. et al. Guided Homing of Cells in Multi-photon Microfabricated Bioscaffolds. *Advanced Healthcare Materials*, (2016).
19. Scott, M. A., Wissner-Gross, Z. D. & Yanik, M. F. Ultra-rapid laser protein micropatterning: screening for directed polarization of single neurons. *Lab on a Chip* 12, 2265-2276 (2012).
20. DeForest, C. A. & Anseth, K. S. Cytocompatible click-based hydrogels with dynamically tunable properties through orthogonal photoconjugation and photocleavage reactions. *Nature Chemistry* 3, 925-931 (2011).
21. DeForest, C. A. & Anseth, K. S. Photoreversible Patterning of Biomolecules within Click-Based Hydrogels. *Angewandte Chemie*, 124, 1852-1855 (2012).
22. DeForest, C. A., Polizzotti, B. D. & Anseth, K. S. Sequential click reactions for synthesizing and patterning three-dimensional cell microenvironments. *Nature Materials*, 8 659-664 (2009).
23. Fuller, S. B., Wilhelm, E. J. & Jacobson, J. M. Ink-jet printed nanoparticle microelectromechanical systems. *Journal of Microelectromechanical Systems* 11, 54-60 (2002).
24. Rothemund, P. W. K. Folding DNA to create nanoscale shapes and patterns. *Nature* 440, 297-302, (2006).
25. Ke, Y. et al. Three-dimensional structures self-assembled from DNA bricks. *Science* 338, 1177-1183 (2012).
26. Singh-Gasson, S. et al. Maskless fabrication of light-directed oligonucleotide microarrays using a digital micromirror array. *Nature Biotechnology* 17, 974-978 (1999).

What is claimed is:

1. A method for three-dimensional fabrication of a nanostructure, the method comprising the steps of:
    a. providing a polyelectrolyte gel;
    b. infusing the polyelectrolyte gel with one or more reactive groups;
    c. illuminating selected voxels within the polyelectrolyte gel to yield a three-dimensional pattern of reactive group sites on the polyelectrolyte gel;
    d. anchoring the one or more reactive groups to the reactive group sites;
    e. removing excess reactive groups from the polyelectrolyte gel;
    f. depositing nanomaterials on the reactive group sites;
    g. shrinking the polyelectrolyte gel by a factor of at least 10× to yield a three-dimensional pattern of reduced scale;
    the three-dimensional pattern is maintained and wherein the three-dimensional pattern of reduced scale is a three-dimensional pattern of nano scale.

2. The method of claim 1, wherein shrinking the polyelectrolyte gel is achieved by exposing the polyelectrolyte gel to salt or an acid.

3. The method of claim 2, further comprising the step of desolvating the polyelectrolyte gel wherein a salt or an acid is used to shrink the gel.

4. The method of claim 1, wherein the nanomaterials comprise metal, or semiconductors.

5. The method of claim 1, further comprising the step of depositing metal on the nanomaterials to grow or enhance the nanomaterials in situ.

6. The method of claim 4, further comprising the step of sintering the nanomaterials.

7. The method of claim 6, wherein the nanomaterials are sintered using any of: application of electrical current across the nanomaterials; a laser; plasma etching, a pulsed light source, or infrared light.

8. The method of claim 1, comprising the additional step of removing a portion of the polyelectrolyte gel.

9. The method of claim 1, wherein the one or more reactive groups further comprise semiconductor nanocrystals.

10. The method of claim 9, wherein the semiconductor nanocrystals comprise cadmium telluride nanoparticles.

11. The method of claim 9, wherein the semiconductor nanocrystals comprise cadmium selenide nanoparticles.

12. The method of claim 1, wherein steps b-e are repeated and the one or more reactive groups formed from one iteration to the next are distinct.

13. The method of claim 1, wherein steps b-f are repeated and the nanomaterials deposited on the reactive group sites from one iteration to the next are distinct.

14. The method of claim 5, wherein the metal is silver.

15. The method of claim 1, wherein any or all of steps b-e are repeated one or more times.

16. The method of claim 1, wherein the three-dimensional pattern of reduced scale also comprises increased resolution.

17. A method for three-dimensional fabrication of a nanostructure, the method comprising the steps of:
    a. providing a polyelectrolyte gel;
    b. infusing the polyelectrolyte gel with one or more reactive groups;
    c. illuminating selected voxels within the polyelectrolyte gel to yield a three-dimensional pattern of reactive group sites anchored to the polyelectrolyte gel;
    d. removing excess reactive groups from the polyelectrolyte gel;

e. depositing nanomaterials on the reactive group sites; and f. shrinking the polyelectrolyte gel to yield a three-dimensional pattern of reduced scale the three-dimensional pattern is maintained and wherein the three-dimensional pattern of reduced scale is a three-dimensional pattern of nanoscale.

18. The method of claim 17, wherein shrinking the polyelectrolyte gel is achieved by exposing the polyelectrolyte gel to a salt or an acid.

19. The method of claim 17, wherein the three-dimensional pattern of reduced scale also comprises increased resolution.

20. The method of claim 17, further comprising the step of desolvating the polyelectrolyte gel wherein a salt or an acid is used to shrink the gel.

21. The method of claim 17, wherein the nanomaterials comprise metal, and/or a semiconductors.

22. The method of claim 21, further comprising the step of depositing metal on the nanomaterials to grow or enhance the nanomaterials in situ.

23. The method of claim 21, further comprising the step of sintering the nanomaterials.

24. The method of claim 23, wherein the nanomaterials are sintered using any of: application of electrical current across the nanomaterials, a laser, a pulsed light source, infrared light or plasma etching.

25. The method of claim 17, comprising the additional step of removing a portion of the polyelectrolyte gel.

26. The method of claim 17, wherein the one or more reactive groups further comprise semiconductor nanocrystals.

27. The method of claim 26, wherein the semiconductor nanocrystals comprise cadmium telluride nanoparticles.

28. The method of claim 26, wherein the semiconductor nanocrystals comprise cadmium selenide nanoparticles.

29. The method of claim 17, wherein steps b-e are repeated and the one or more reactive groups formed from one iteration to the next are distinct.

30. The method of claim 17, wherein steps b-f are repeated and the nanoparticles deposited on the reactive group sites from one iteration to the next are distinct.

31. The method of claim 22, wherein the metal is silver.

32. The method of claim 17, wherein any or all of steps b-e are repeated one or more times.

33. A method for three-dimensional fabrication of a nanostructure, the method comprising the steps of:
   a. providing a polyelectrolyte gel containing nanomaterials in one or more patterns; and
   b. depositing metal on the patterned nanomaterials to grow or enhance the nanomaterials in situ; and
   c. shrinking the polyelectrolyte gel to yield a three-dimensional pattern of reduced scale the three-dimensional pattern is maintained and wherein the three-dimensional pattern of reduced scale is a three-dimensional pattern of nano scale.

34. The method of claim 33, wherein the three-dimensional pattern of reduced scale also comprises increased resolution.

35. The method of claim 33, wherein shrinking the polyelectrolyte gel is achieved by exposing the polyelectrolyte gel to a salt or an acid.

36. The method of claim 33, further comprising the optional step of desolvating the polyelectrolyte gel wherein a salt or an acid is used to shrink the gel.

37. The method of claim 33, comprising the additional step of removing a portion of the polyelectrolyte gel.

38. A method for three-dimensional fabrication of nanostructures, the method comprising the steps of:
   a. providing a polyelectrolyte gel;
   b. infusing the polyelectrolyte gel with one or more reactive groups;
   c. illuminating selected voxels within the polyelectrolyte gel to yield a three-dimensional pattern of reactive group sites anchored to the polyelectrolyte gel;
   d. removing excess reactive groups from the polyelectrolyte gel;
   e. depositing functional molecules on the reactive group sites;
   f. shrinking the polyelectrolyte gel to yield a three-dimensional pattern of reduced scale and increased resolution the three-dimensional pattern is maintained and wherein the three-dimensional pattern of reduced scale is a three-dimensional pattern of nano scale.

39. The method of claim 38, optionally further comprising the step of expanding the polyelectrolyte gel to yield an expanded gel at any point prior to step f.

40. The method of claim 38, wherein shrinking the polyelectrolyte gel is achieved by exposing the polyelectrolyte gel to a salt or an acid.

41. The method of claim 38, further comprising the optional step of desolvating the polyelectrolyte gel wherein a salt or an acid is used to shrink the gel.

42. The method of claim 38, comprising the additional step of removing a portion of the polyelectrolyte gel.

43. The method of claim 38, wherein steps b-e are repeated and the one or more reactive groups formed from one iteration to the next are distinct.

44. The method of claim 38, wherein steps b-f are repeated and the functional molecules deposited on the reactive group sites from one iteration to the next are distinct.

45. The method of claim 38, wherein any or all of steps b-e are repeated one or more times.

* * * * *